United States Patent [19]

Young

[11] Patent Number: 4,823,051

[45] Date of Patent: Apr. 18, 1989

[54] INFRARED ACTUATED CONTROL SWITCH ASSEMBLY

[75] Inventor: William A. Young, Aurora, Colo.

[73] Assignee: Pittway Corporation, Northbrook, Ill.

[21] Appl. No.: 52,763

[22] Filed: May 21, 1987

[51] Int. Cl.$^4$ .......................... G01J 5/08; G08B 13/18
[52] U.S. Cl. ..................................... 315/155; 315/158; 315/159; 250/221; 250/342; 250/353; 340/567
[58] Field of Search ............... 315/362, 363, 158, 149, 315/150, 159, 157, 156; 250/338, 347, 353, 221, 342; 340/567

[56] References Cited

U.S. PATENT DOCUMENTS

| | | | |
|---|---|---|---|
| 3,972,598 | 8/1976 | Kunz | 250/338 |
| 4,058,726 | 11/1977 | Paschedag et al. | 250/353 |
| 4,207,468 | 6/1980 | Wilson | 250/338 |
| 4,225,786 | 9/1980 | Perlman | 250/342 |
| 4,271,360 | 6/1981 | Ward | 250/338 |
| 4,352,046 | 9/1982 | Tigner et al. | 315/362 |
| 4,514,630 | 4/1985 | Takahashi | 250/353 |
| 4,514,631 | 4/1985 | Guscott | 250/353 |
| 4,604,524 | 8/1986 | Kotlicki et al. | 250/353 X |
| 4,606,600 | 8/1986 | Schmidt | 350/1.1 |
| 4,612,442 | 9/1986 | Toshimichi | 250/342 X |
| 4,618,854 | 10/1986 | Miyake et al. | 250/342 X |
| 4,625,115 | 11/1986 | Guscott | 250/353 |
| 4,642,454 | 2/1987 | Carlson | 250/342 X |
| 4,644,164 | 2/1987 | Mudge | 250/342 X |
| 4,672,206 | 6/1987 | Suzuki et al. | 250/353 |
| 4,682,030 | 7/1987 | Rose et al. | 250/338.3 X |
| 4,689,486 | 8/1987 | Lederer | 250/338 |
| 4,692,619 | 9/1987 | Masuda et al. | 250/342 X |
| 4,697,081 | 9/1987 | Baker | 250/338.3 |
| 4,707,604 | 11/1987 | Guscott | 340/567 X |
| 4,757,204 | 6/1988 | Baldwin et al. | 250/342 |

FOREIGN PATENT DOCUMENTS

| | | |
|---|---|---|
| 0062004 | 6/1982 | European Pat. Off. . |
| WO8202270 | 7/1982 | PCT Int'l Appl. . |
| 1085830 | 10/1967 | United Kingdom . |
| 1325810 | 8/1973 | United Kingdom . |
| 2141853A | 1/1985 | United Kingdom . |
| 2155708A | 9/1985 | United Kingdom . |
| 2187018A | 8/1987 | United Kingdom . |

Primary Examiner—Leo H. Boudreau
Assistant Examiner—Mark R. Powell
Attorney, Agent, or Firm—Dressler, Goldsmith, Shore, Sutker & Milnamow, Ltd.

[57] ABSTRACT

A switch assembly actuated by passive infrared radiation for operating a ceiling light in a room, the switch assembly including first and second optical independent systems which senses infrared radiation over a 360° range in horizontal plane including two separate vertical fields of view, a shallow cone-shaped "look-out" and a more vertical cone-shaped "look-down" sensing field of view for directing to a common sensing element passive infrared radiation produced by a person moving within the sensing field of the switch assembly, the sensing element connected to a control circuit which responsively turns on the light, maintains the light on while the person remains in the room, and turns the light off automatically when the person leaves the room. The switch assembly includes a one-piece optical shell enclosed within a housing which is adapted for installation in a conventional light bulb socket and including a socket for receiving the light bulb to be controlled.

47 Claims, 12 Drawing Sheets

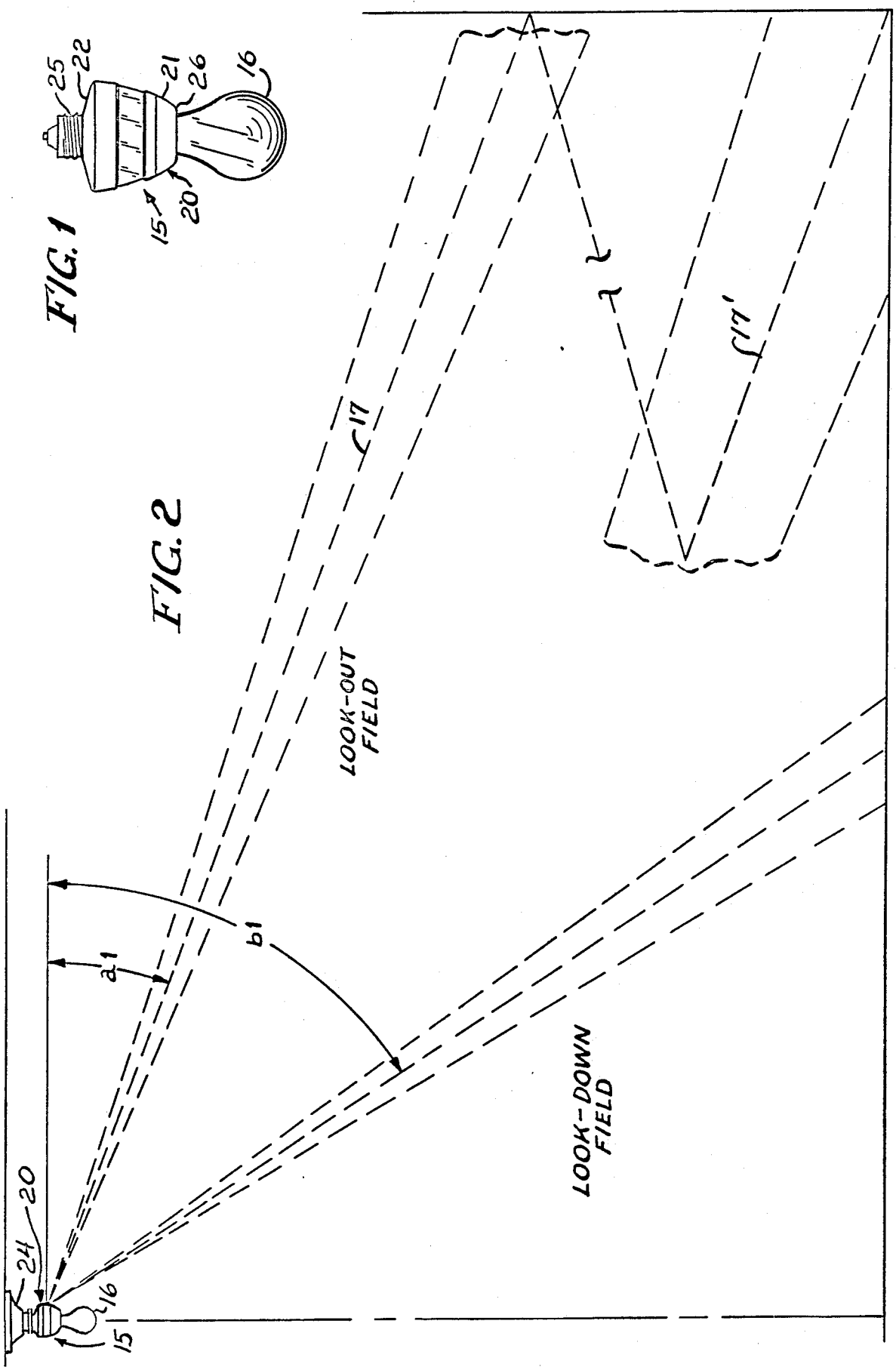

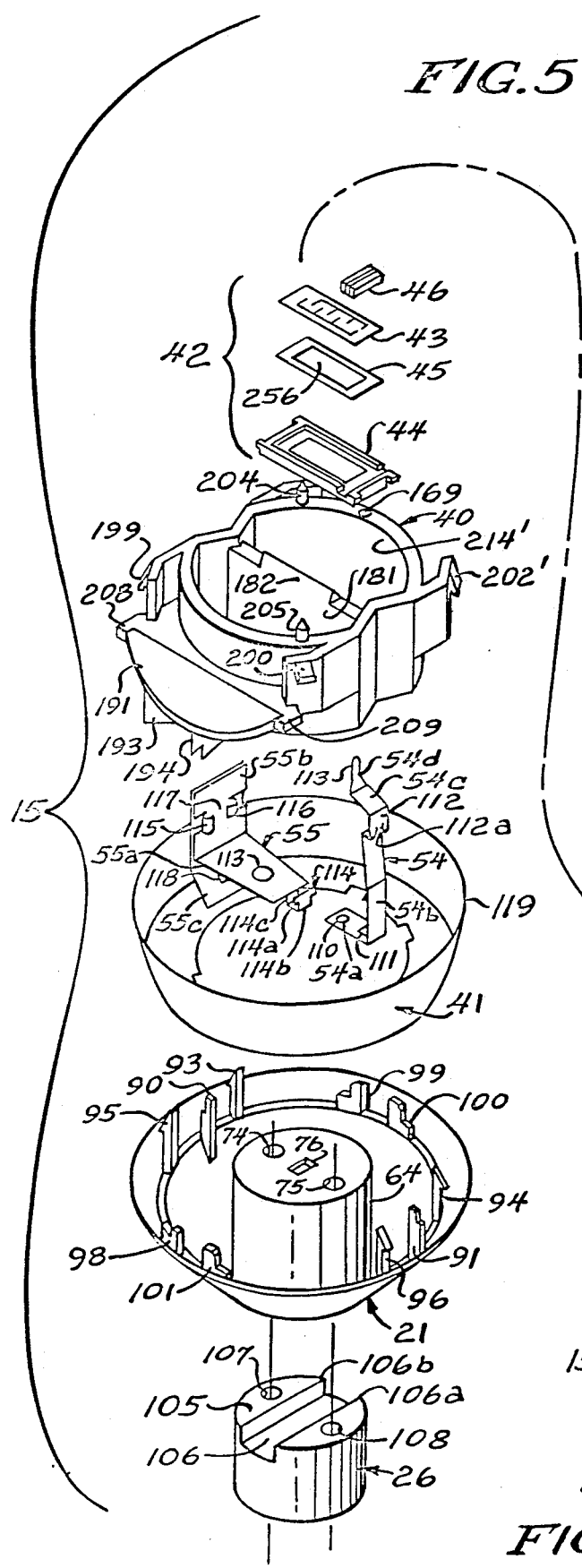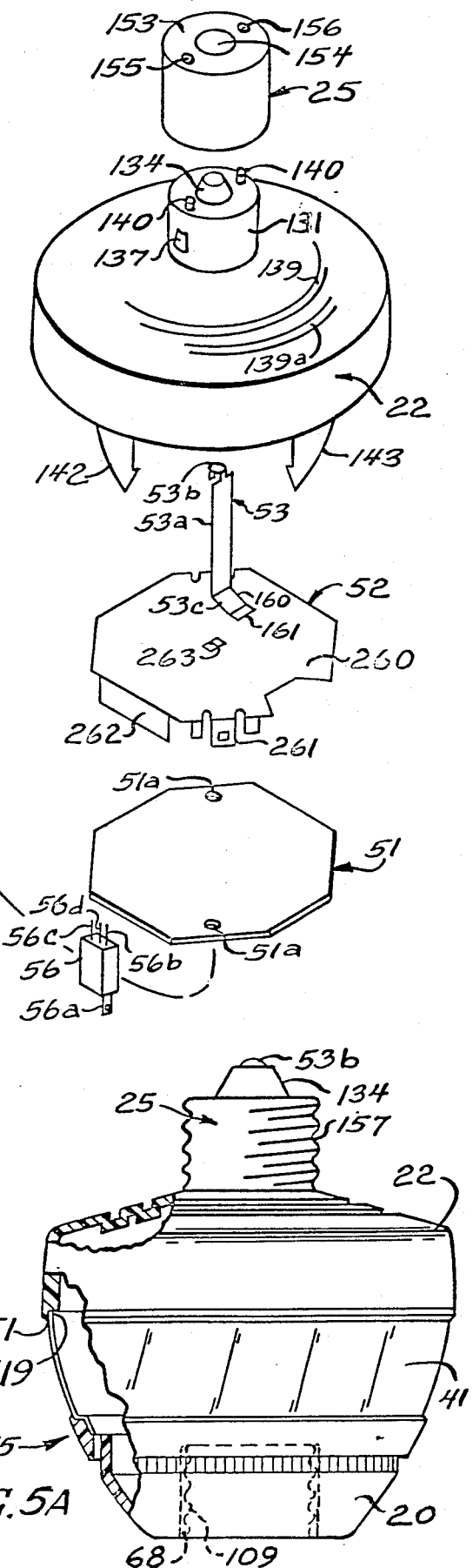
FIG.5
FIG.5A

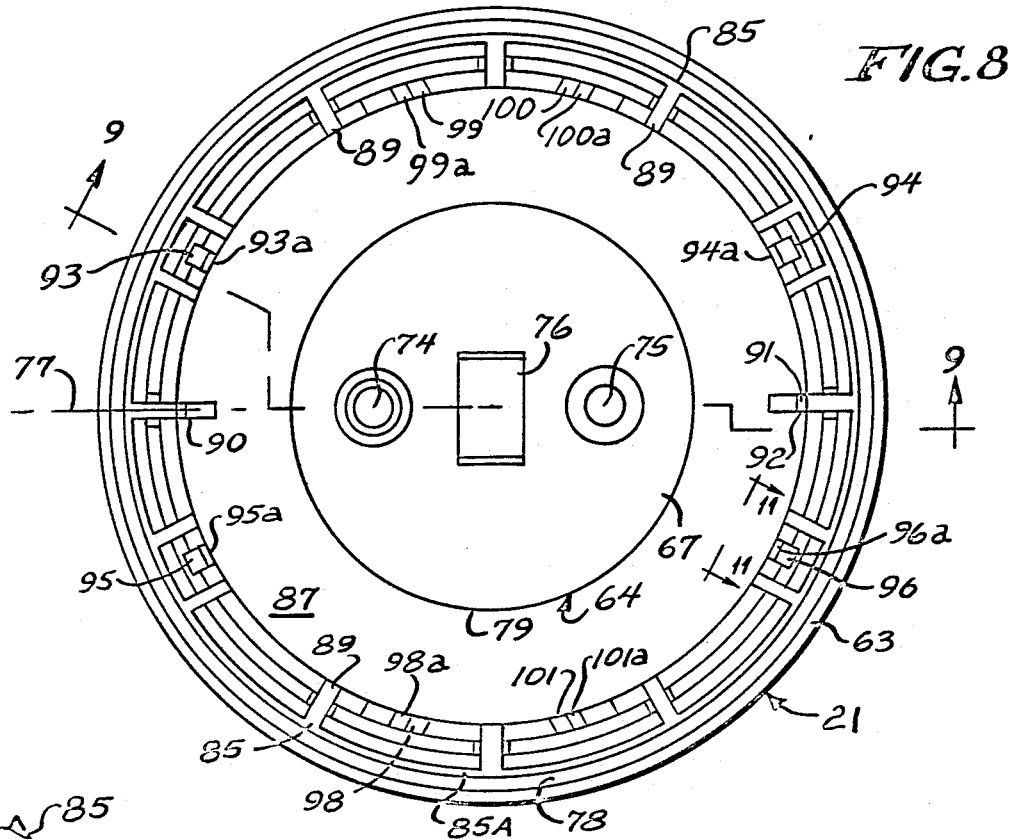
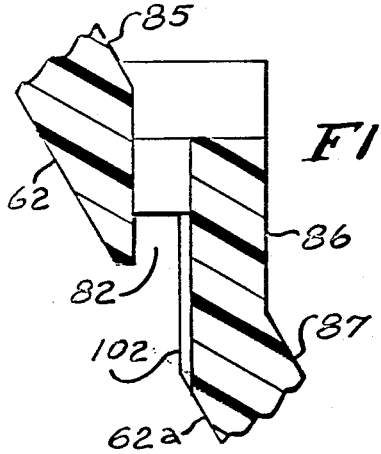
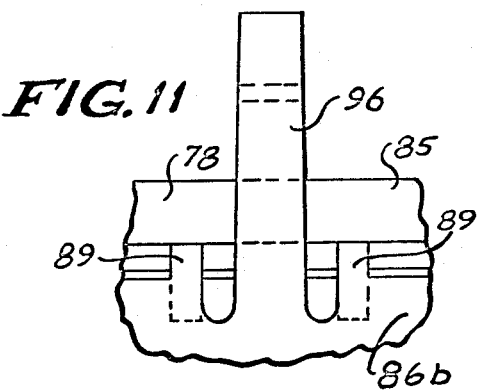
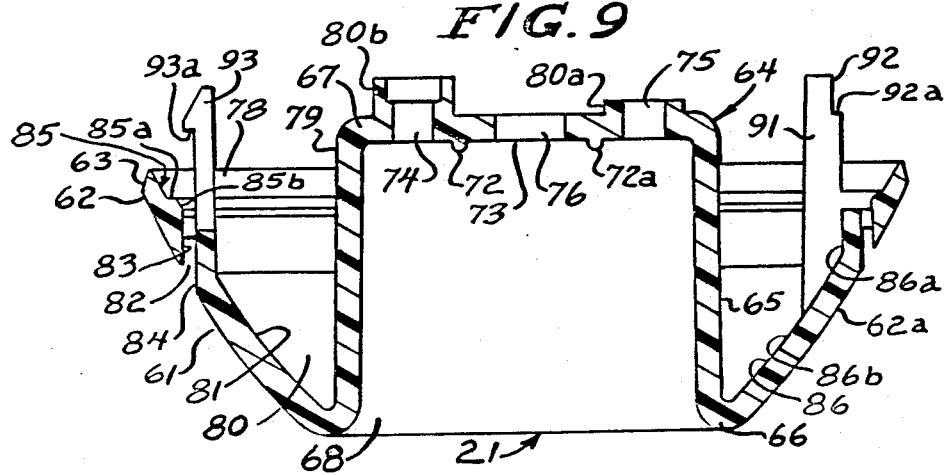

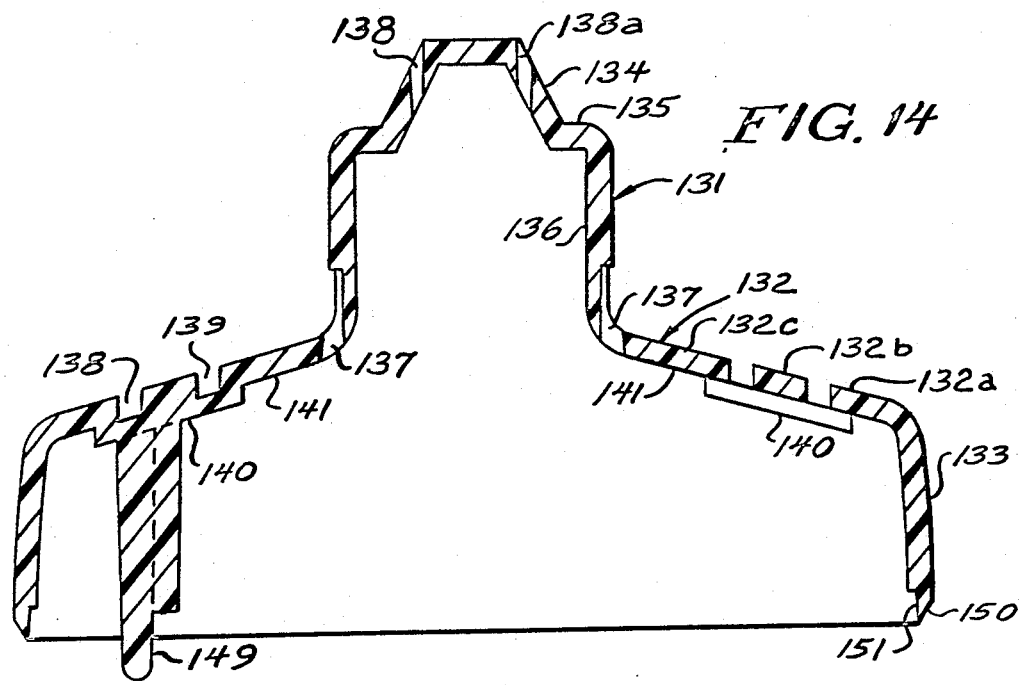
FIG. 14
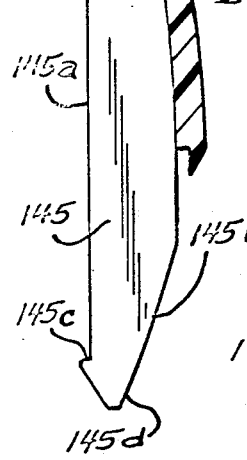
FIG. 16
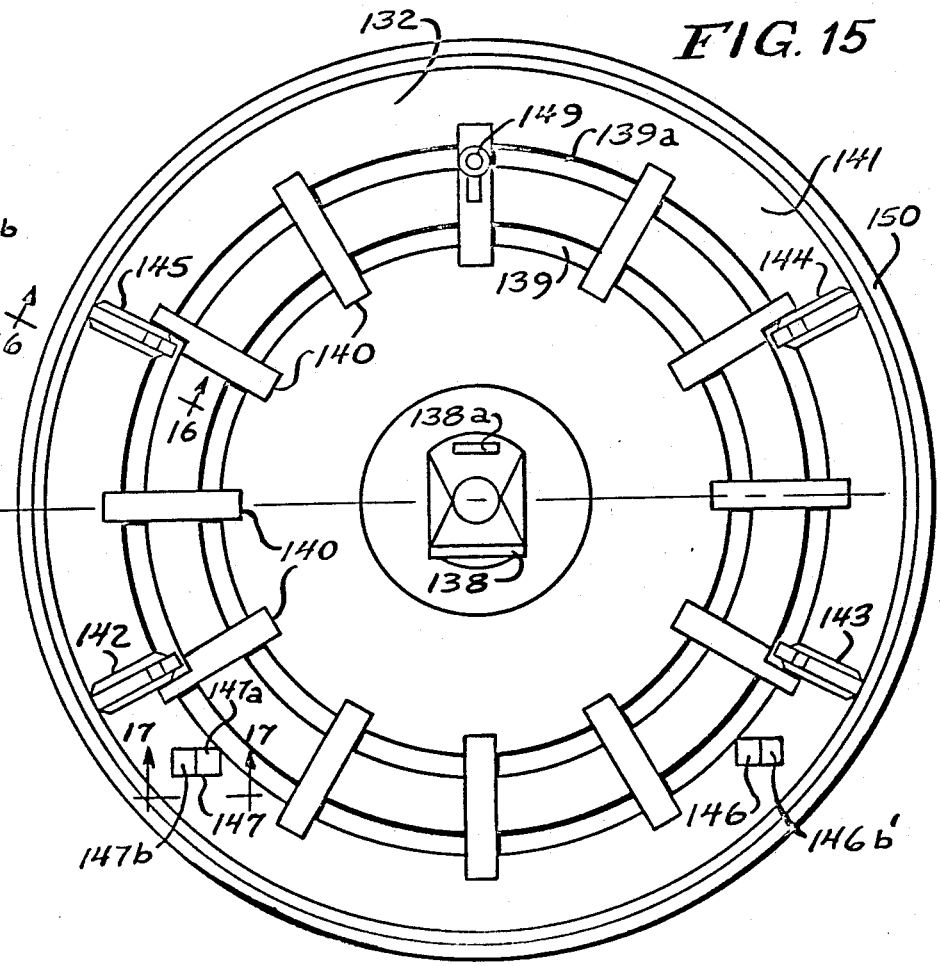
FIG. 15
FIG. 17

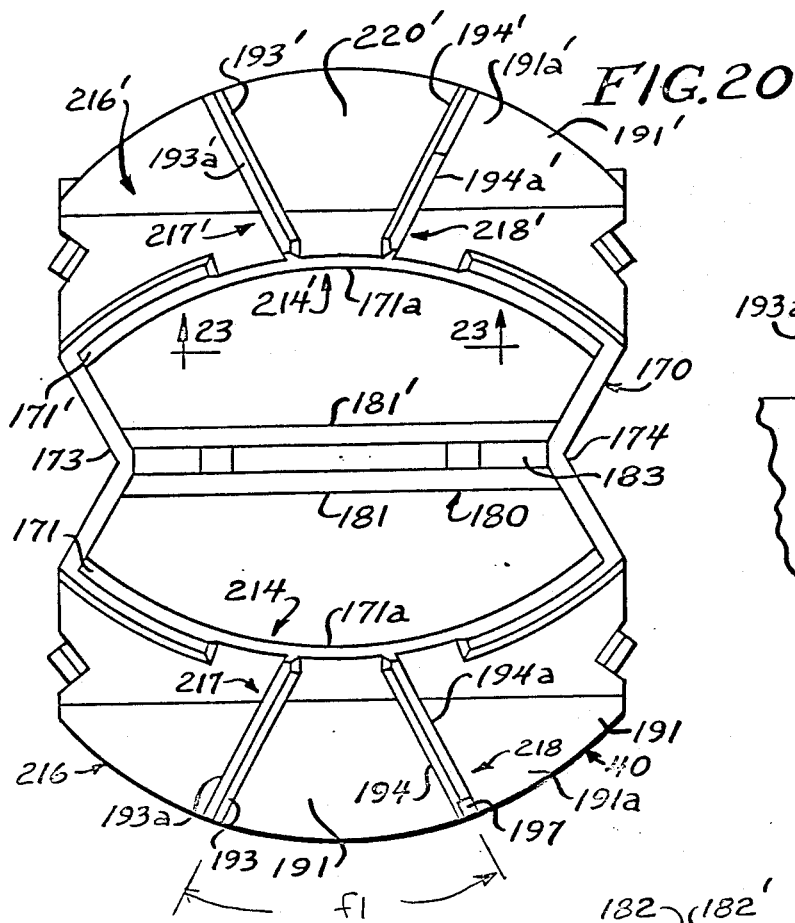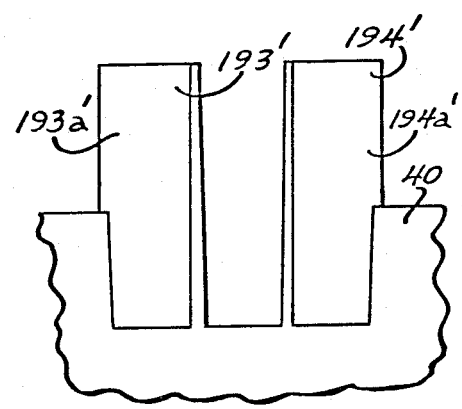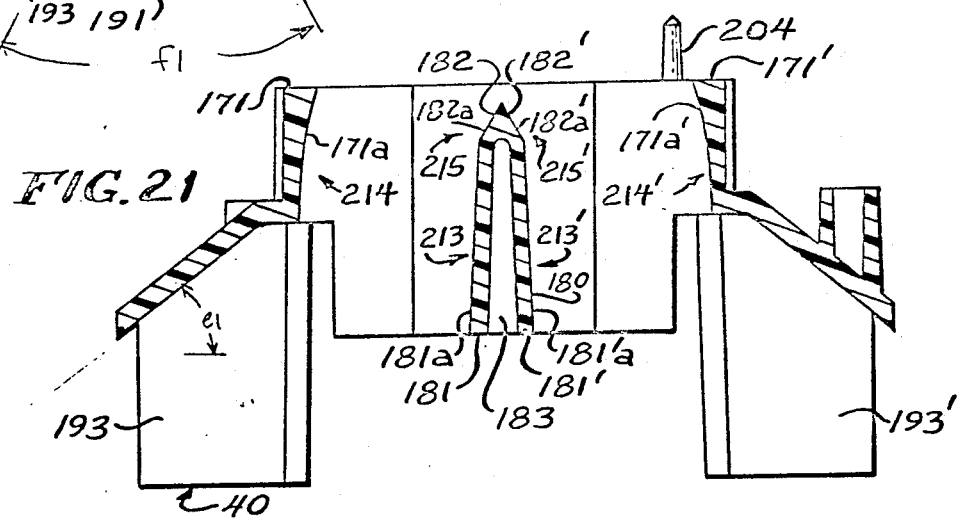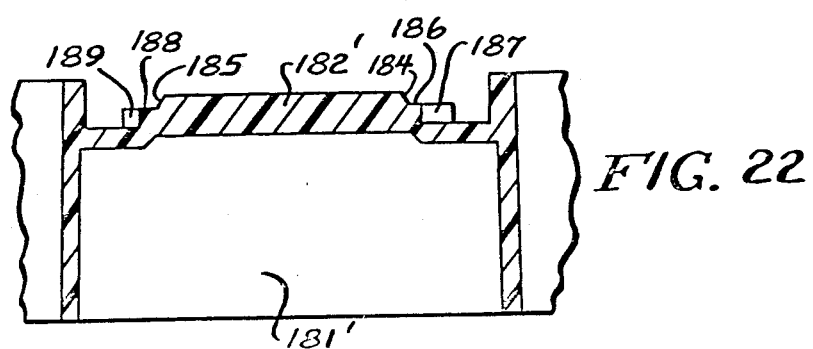

INFRARED ACTUATED CONTROL SWITCH ASSEMBLY

BACKGROUND OF THE INVENTION

This invention relates to passive infrared radiation actuated motion detection apparatus, and more particularly to a passive infrared (PIR) actuated switch assembly for controlling the operation of a functional device in response to detection of movement of a source of infrared radiation within an area monitored by the switch assembly.

Presently, the operation of electric lights is controlled by manually operated switches. Wall switches are provided for controlling the energization and deenergization of ceiling mounted lamps or lamps plugged into electrical receptacles wired to the wall switch. A person entering a darkened room must search for the wall switch to turn on the room light. In the instance where the person is carrying articles and does not have a free hand for searching for the wall switch, the person must enter the room and set down the articles before groping for the light switch. Similarly, when a person is about to leave a room carrying a number of items, the person must either turn off the light before picking up the items before leaving the room, or must leave the room light on.

It is common practice for persons leaving the room to leave the light on even though the person may not intend to return to the room. Thus, the room lights are maintained on even when they are not needed. This practice results in waste of energy.

Thus, it would be desirable to have an arrangement for controlling the energization of a room light automatically and instantly in response to a person entering a room and which provides for deenergization of the light when the person exits the room.

SUMMARY OF THE INVENTION

Accordingly, it is an object of the present invention to provide an improved control switch assembly which responds to variations in passive infrared radiation produced as the result of a movement of a source of infrared radiation within a given space and controls the operation of a functional device.

It is another object of the present invention to provide a control switch assembly which responds to passive infrared radiation indicative of movement of a source of infrared radiation within a given space to energize a ceiling mounted light within the space for illuminating the space.

A further object of the present invention is to provide a ceiling mounted control switch assembly which detects passive infrared radiation within a space, both in a 360° look-out field encircling the switch assembly and in a 360° look-down field extending beneath the switch assembly, and responds to variation in the infrared radiation detected, indicative of movement of a source of infrared radiation within a field of view of the switch assembly, to illuminate the space.

Another object of the present invention is to provide an infrared radiation actuated control switch assembly for controlling the energization of a light bulb wherein the switch assembly is adapted for mounting in a conventional light bulb socket and couples the light bulb it controls to the socket.

Yet another object of the present invention is to provide a one-piece optical unit for directing infrared radiation from a plurality of sensing fields to a sensing element including a cone-shaped sensing field extending outwardly from the unit over a 360° range and a cone-shaped sensing field extending downwardly beneath the unit over a 360° range.

The present invention provides an infrared radiation actuated control switch assembly responsive to infrared radiation within a given space for controlling a functional device in response to detection of variation in infrared radiation, indicative of movement of a source of infrared radiation within the space. The switch assembly includes sensing means including a sensing element responsive to infrared radiation optical means defining first and second independent optical systems, control circuit means, and housing means for containing the sensing means, the optical means and the control circuit means. The housing means is constructed and arranged for mounting within the space. The optical means is supported within the housing and each optical system includes first and second reflecting means and focusing means. The sensing means include means mounting the sensing element in an operative relation with focusing means. The first reflecting means responds to infrared radiation within a cone-shaped first sensing field at a first predetermined semivertical angle within the space. The second reflecting means responds to infrared radiation within a cone-shaped sensing field at a second predetermined semivertical angle within the space. The focusing means focuses infrared radiation from associated first and second sensing fields reflected by the first and second reflecting means onto the sensing element. The circuit means is connected to the sensing element and responsive to the sensing element for providing an output for energizing the functional device in response to variation in infrared radiation focused onto the sensing element by either one of the optical systems, indicative of movement of a source of infrared radiation within the space.

Further in accordance with the invention there is provided an optical array for directing infrared radiation from a plurality of sensing fields to an infrared radiation sensing means. The optical array comprises a hollow body having first and second side walls, first and second end walls, and an intermediate wall, end walls interconnecting the side walls near the ends thereof. The side walls having opposing concave reflective surface portions defining first and second focusing mirrors. The intermediate wall extends along the longitudinal axis of the hollow body between the end walls and has first and second planar reflective surfaces facing the first and second focusing mirrors, respectively, and positioned to reflect infrared radiation from the sensing fields onto the focusing mirrors, and third and fourth planar reflective surfaces facing said first and second focusing mirrors, respectively, and located at the focal points thereof, for reflecting infrared radiation focused by the focusing mirrors onto the sensing means.

The invention consists of certain novel features and structural details hereinafter fully described, illustrated in the accompanying drawings, and particularly pointed in the appended claims, it being understood that various changes in the details may be made without departing from the spirit, or sacrificing any of the advantages of the present invention.

DESCRIPTION OF THE DRAWINGS

For the purpose of facilitating and understanding the invention, there is illustrated in the accompanying drawings a preferred embodiment thereof, from an inspection of which, when considered in connection with the following description, the invention, its construction and operation, and many of its advantages will be readily understood and appreciated.

FIG. 1 is an elevation view of a control switch assembly provided by the present invention shown with a light bulb received in a socket of the assembly;

FIG. 2 is an elevation view a room showing the switch assembly mounted in a light socket in the ceiling of the room and illustrating the look-out field and the look-down field for the switch assembly;

FIG. 5 is an exploded perspective view of the switch assembly;

FIG. 5A is an elevation view, partially cut away, of the switch assembly;

FIG. 8 is a plan view of the housing base;

FIG. 9 is a vertical sectional view taken along the line 9—9 of FIG. 8;

FIG. 10 is an enlarged fragmentary sectional view of the housing base taken along the line 10—10 of FIG. 6;

FIG. 11 is an enlarged fragmentary sectional view of the housing base taken along the line 11—11 of FIG. 8;

FIG. 14 is a vertical section view taken along the line 14—14 of FIG. 13;

FIG. 15 is a bottom plan view of the housing cover;

FIG. 16 is an enlarged fragmentary sectional view taken along the line 16—16 of FIG. 15;

FIG. 17 is an enlarged fragmentary sectional view taken along the line 17—17 of FIG. 15;

FIG. 20 is a bottom plan view of the optic shell;

FIG. 21 is a side sectional view of the optic shell taken along 21—21 of FIG. 18;

FIG. 22 is a fragmentary vertical section view taken along the line 22—22 of FIG. 18;

FIG. 23 is an fragmentary sectional view taken along the line 23—23 of FIG. 20;

DESCRIPTION OF THE PREFERRED EMBODIMENT

Figure 3:
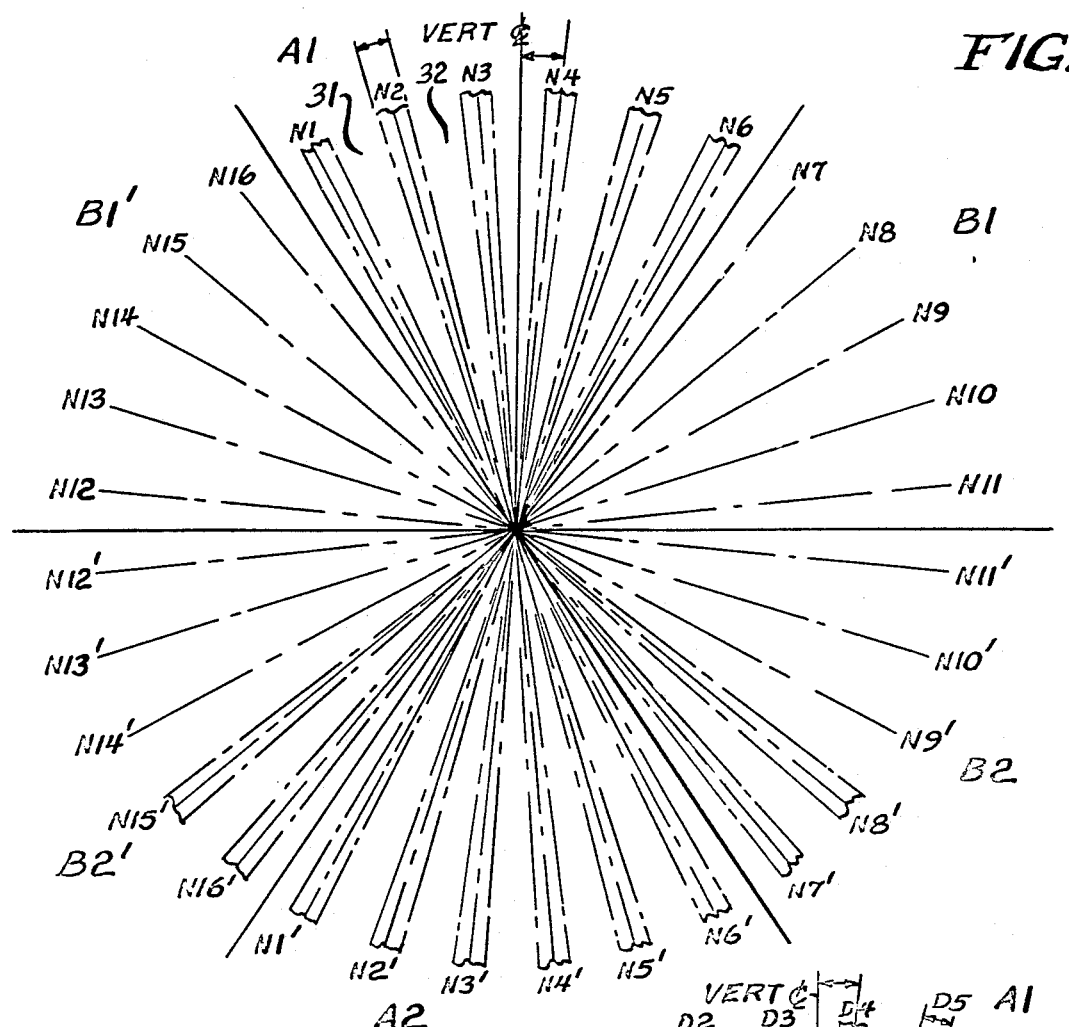
FIG. 3 is a downward plan view of the sensing zones of the look-out field for the switch assembly.

Referring to FIGS. 1 and 2, the passive infrared actuated switch assembly 15 incorporating the features of the present invention is described as being used to control the energization and deenergization of a light bulb 16 in a room. The passive infrared actuated switch assembly 15 includes a two-piece housing 20 including a base 21 and a cover 22. The cover 22 is provided at its upper end with a male connector 25 which is adapted to be screwed into a conventional light bulb socket for energizing the switch assembly 15. The base 21 is provided at its lower end with a female connector 26 which is adapted to receive the light bulb 16.

As shown in FIG. 2, the switch assembly is installed in an existing ceiling mounted light bulb socket 24. The light bulb 16 is screwed into the female connector 26 at the lower end of the housing 20. As will be shown, the switch assembly 15 responds to the presence of a source of infrared radiation moving in the detection fields of the switch assembly to energize the light bulb 16. For purposes of illustration, the switch assembly is described as responding to movements of a person within a room or space. However, the switch assembly responds to changes in infrared radiation levels and anything hotter or colder than ambient would be detected. The light bulb 16 is maintained energized as long as the person remains in the sensing field of the switch assembly 15 and movement of the person is sensed by the switch assembly. Once activated following the detection of infrared radiation, the assembly maintains the light bulb energized for a preset time period, for example four minutes, even after movement of the person is no longer sensed. This delayed turnoff feature enables the switch assembly to keep the light bulb lit even though the person leaves the room or remains motionless in the room as when sitting down reading or watching television.

The switch assembly 15 senses infrared radiation over a 360° range in horizontal planes. The sensing range includes two separate vertical fields of view, a shallow "look-out" field which extends downwardly at an angle a1 relative to the horizontal and a more vertical "look-down" field which extends downwardly at an angle b1 relative to the horizontal. In one switch assembly which was constructed, the angles a1 and b1 were 20° and 56°, respectively. Each field in vertical planes extends approximately 2° on either side of center lines represented by the dashed lines 17 and 17' for the "look-out" field and the "look-down" field, respectively.

The effective lengths of sensing ranges for the "look-out" field and the "look-down" field are determined by the composition and configuration of the sensor used and by the size of the room in which the switch assembly is mounted. The sensor used in an exemplary embodiment had a maximum sensing range on the order of 25 to 30 feet. When such a switch assembly is mounted at ceiling height, the effective sensing range is governed by the height of the ceiling. For example, when such a switch assembly 15 is mounted on the ceiling in the center of a room having a ceiling height of eight feet, the maximum effective sensing range is approximately twenty feet at floor level because the "look-out" field intersects the floor at this point for an angle a1 of 20°. Similarly, the maximum "look-down" field maximum range is approximately five feet at floor level from the middle of the floor for an angle b1 of 56°.

A person entering the room has to pass through the "look-out" field and would then cause the light bulb to be lit and remain lit for at least the duration of the delayed turn off period. Assuming that the person moves to the center of the room, the person will pass out of the "look-out" field and pass through the "look-down" field, movements within either sensing fields being detected by the switch assembly to maintain the bulb lit. Between the "look-out" field and the "look-down" field, there is a small annular dead zone having a radius of about six feet to about seven feet measured from a point directly beneath the switch assembly. A person standing in that zone who is less than five feet tall would not be detected. However, movements of such person would have been detected to cause the lamp to be lit at least as that person passed through "look-out" field upon first entering the room, and the lamp would be kept lit for at least the duration of the delayed turn off interval. Realistically, the person would not remain in that dead zone long, and movement of the person's leg or foot into the "look-down" field or that person's head or shoulder into the "look-out" field, even momentarily would serve to maintain the lamp lit.

For the "look-down" field, there is a circular dead zone having a radius of approximately two feet measured from a point directly beneath the switch assembly. In other words, a person standing in that zone who is less than five feet tall would not be detected. However, a person located directly beneath the switch assembly would move into the sensing range from time to time, and such movements would be sensed by the switch assembly, enabling the bulb to remain lit.

Thus, with an effective sensing range of approximately twenty feet from the middle of the floor, if the distance in a horizontal plane, from the switch assembly to each wall of a room is less than twenty feet, the combination of the "look-out" and "look-down" fields provided by the ceiling mounted switch assembly 15 defines a sensing area for the switch assembly which covers an entire room, permitting detection of the movements of a person substantially anywhere in the room.

Referring to FIG. 3, as will be shown, the switch assembly 15 comprises a dual optical system, each system providing a 180° "look-down" field having three sensing fields of approximately 60° in angular extent, the two systems providing a 360° "look-out" field for the switch assembly. The 360° sensing field is a cone-shaped sensing field at a predetermined semivertical angle which for an angle a1 (FIG. 2) of 20° is 70°. In FIG. 3, the six sensing fields are labeled A1, B1, B1', A2, B2 and B2'. Sensing fields A1, B1, and B1' include sixteen sensing zones N1–N16. Sensing field A1 includes six sensing zones N1–N6 in the center portion of a 180° angular extent of the sensing range. Sensing field B1 includes five sensing zones N7–N11 and sensing field B1' includes five sensing zones N12–N16 on either side of the central zones N1–N6. Each sensing zone has an angular width of approximately 5.625°, and is, for example, approximately 36" wide at a distance of about twenty feet radially outward from the switching assembly which is located at the mid-point. The longer the range, the greater the arc and the wider the field of view will be.

Similarly, sensing fields A2, B2, and B2' include sixteen sensing zones N1'–N16' corresponding to the sensing zones N1–N16.

The thirty-two sensing zones N1–N16 and N1'–N16', and the spaces between adjacent zones, such as space 31 between zones N1 and N2, space 32 between zones N2 and N3, etc., are determined by the configuration of the optical system and of the infrared sensor of the switch assembly as will be described.

Figure 4:
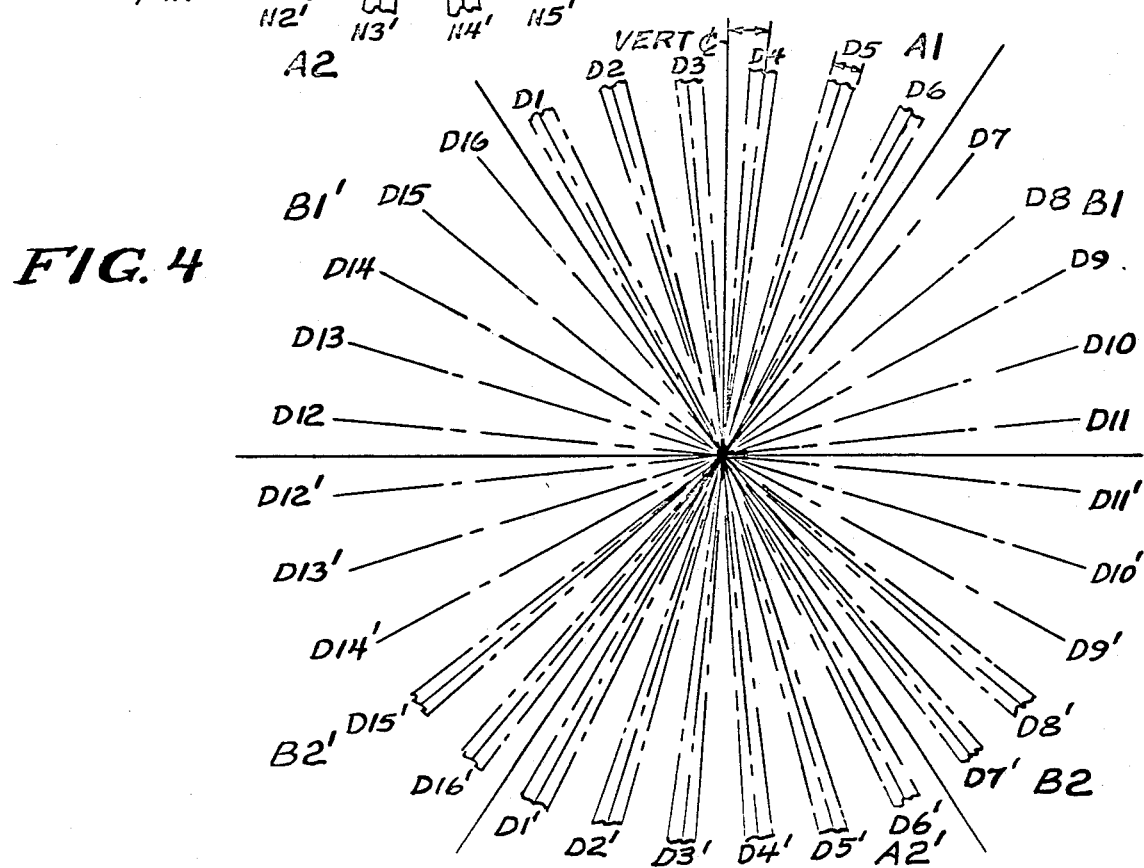
FIG. 4 is a downward plan view of the sensing zones of the look-down field for the switch assembly.

Referring to FIG. 4, the "look-down" field is also a cone-shaped sensing field which has the same projections in a horizontal plane as the "look-out" field but is at a smaller semivertical angle, which for a 56° angle b1 (FIG. 2) is 44°. The 360° "look-down" field, which comprises two 180° fields provided by the two optical systems, includes thirty-two "look-down" sensing zones which are defined similar to the thirty-two sensing zones N1'–N16 and N1'–N16'. The "look-down" sensing zones have been labeled D1–D16 and D1'–D16' in FIG. 4. Sensing fields A1, B1, and B1' define "look-down" sensing zones D1–D6, D7–D11 and D12–D16, respectively. Similarly, sensing fields A2, B2 and B2' include "look-down" sensing zones D1'–D6', D7'–D11' and D12'–D16', respectively. Each sensing zone has an angular width of approximately 5.625° and is approximately 12" wide at a distance of 5 feet radially outward from the switch assembly.

Switch Assembly

Referring to FIG. 5, which is an exploded perspective view of the switch assembly 15 in simplified form, the housing is formed by base 21, shown in detail in FIGS. 6–11, and cover 22 shown in detail in FIGS. 12–17, which enclose optical and electrical components of the switch assembly. The switch assembly includes an optic shell 40, shown in detail in FIGS. 18–24, a lens 41, shown in detail in FIGS. 25–26, a sensor assembly 42 including an infrared sensor 43 and a holder 44, shown in detail in FIGS. 27–30, a sensor frame 45 and a sensor connector 46. The switch assembly 15 further includes a printed circuit board 51 which mounts the components of the electronic circuit, shown in diagramatic form in FIG. 33. The electronic circuit responds to the infrared sensor 43 and generates control signals for causing energization and deenergization of the light bulb 16 (FIG. 1) controlled by the switch assembly 15. A static shield 52 overlies the printed circuit board 51. Three electrical contacts 53–55 provide electrical connections between the electronic circuit carried by printed circuit board and the power input and power output conducting elements provided by the male connector 25 and by the female connector 26. Contact 53 is attached and extends through the cover 22. Contacts 54 and 55 are mounted to the base 21. Contact 55 receives a triac 56 by its mounting lug 56a which is the output switching element of the electronic circuit.

Base Sub-assembly

Referring to FIG. 5, the base 21, the female connector 26, the lens 41, and contacts 54 and 55 form a base sub-assembly.

Referring to FIGS. 6–11, the base, which is of a plastic material, such as Valox DR48, has a generally frusto-conical outer wall portion 61 which terminates in its upper edge 62 in an annular bevelled edge 63 which encircles a central hub portion 64. As shown best in FIG. 9, the central hub portion 64 is generally cylindrical in shape and has a tubular wall portion 65 which extends upwardly from the lower end 66 of the outer wall 61 and is enclosed at its upper end by a generally flat disc or circular top portion 67 defining a hollow generally cylindrical chamber 68 in the central portion of the base 21, opening to the bottom of the base 21. The chamber 68 is dimensioned to receive the female connector 26 (FIGS. 5 and 5A). The top surface of the hub 64 is also provided with a pair of circular apertures 74 and 75 and a generally rectangular aperture 76 therethrough.

Referring to FIGS. 8 and 9, the inner surface 78 of the bevelled annular edge 63 of the base 21 is spaced apart from the outer surface 79 of the hub 64, defining the open upper end of a channel 80 defined by the inner surface 81 of the frustoconical wall 61 and the hub outer surface 79. The channel 80, which is generally triangular in cross-section, extends around the hub 64. The inner surface of the frustoconical wall 61 is divided into the upper edge portion 62 and lower portion 62a by a generally vertical annular slot 82 defined by opposing vertical surfaces 83 and 84. Slot 82 permits air flow into the housing 20 through the base 21. The inner surface of the upper edge portion 62 includes a downwardly sloping portion 85, an annular shoulder 85a and a further downwardly sloping portion 85b which terminates in vertical surface 83. Shoulder 85a locates the lens 41 (FIG. 5) in the assembled control switch. Referring to FIG. 9, the inner wall 86 of the lower portion 62a includes a vertical section 86a and a downwardly and inwardly sloping portion 86b which terminates at the base of the hub 64. As shown best in FIGS. 8 and 11, a plurality of ribs 89 connect the inner sloping surface 85 of the upper edge portion 62 to the sloping surface portion 86b of the lower portion 62a.

Referring to FIGS. 8 and 9, a pair of posts 90 and 91 extend vertically upward from the upper portion of sloping surface 86b at diametrically opposed positions along a diameter of the base 21 passing through the center points of the apertures 74-76 in the hub 64. Posts 90 and 91 support respective contacts 54 and 55 which are mounted on the base 21. As shown best in FIG. 9, each post, such as post 91 extends slightly higher than the surface of top portion 67 of the hub 64. Each post, such as post 91 has a notch 92 formed therein defining a shoulder 92a.

Figure 6:
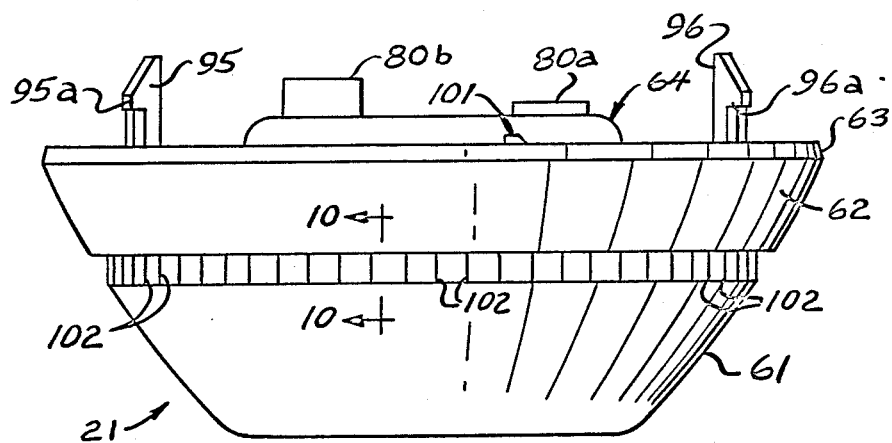
FIG. 6 is a front elevation view of the housing base of the switch assembly.

Referring to FIGS. 6, 8, 9 and 11, the vertically extending portion 86a of the bottom portion 62a of the base 21 has four vertical extensions 93-96 in the form of vertical posts each of which terminates in a hook portion, such as hook portions 95a and 96a for hooks 95 and 96 as shown in FIG. 6. The hook portions of the four extensions 93-96 extend above the upper edge of the base 21 as shown in FIG. 6. Each of the extensions 93-96 is spaced 27° in arcuate length from the center line passing through apertures 74-76 and cooperate with mating hooks (FIGS. 12-13) on the cover 22 to lock the cover to the base.

Referring to FIGS. 5, 6 and 8, the vertical surface 86a further defines four stepped projections 98-101 each off set 28.1° in arcuate length from a line extending normal to the axis of the base 21 which runs through the center points of apertures 74-76. Projections 98-101 located the optic shell 40 (FIG. 5) on the base. With reference to FIGS. 5, 8 and 9, the projections 98-101 are generally L-shaped defining respective shoulders 98a-101a. The projections 98-101 are disposed in pairs, such as projections 98 and 101, with their respective shoulder portions 98a and 101a extending away from one another.

As best shown in FIGS. 6 and 10, the outer surface of the bottom edge portion 66 of the housing defines a plurality of V-ribs 102.

Referring to FIG. 5, the female connector 26 is a generally cylindrical member closed at its upper end by a top portion 105 having a slot 106 formed therein between edges 106a and 106b and a pair of apertures 107 and 108 formed therethrough. As best shown in FIG. 5A, the inner surface 109 of the female connector 26 is provided with a standard bulb thread.

With continued reference to FIG. 5, contacts 54 and 55 are of brass. Contact 54 includes a horizontally extending foot or mounting portion 54a, a vertically extending portion 54b, a C-shaped mounting portion 54c, and a contact portion 54d. Mounting portion 54a includes a circular aperture 110 and a rectangular aperture 111. Mounting portion 54c includes a cutout 112 defining a tooth 112a in the vertical section of the C-shaped portion 54c. Contact portion 54d tapers inwardly and upwardly defining a tab 113.

Contact 55 has a generally trapezoidal shaped cantilever portion 55a, a generally rectangular vertical contact portion 55b and a heat dissipation portion 55c. The cantilever portion 55a has an aperture 113 formed therethrough and a depending U-shaped contact portion 114 having a generally rectangular shaped base 114a and two upright sides 114b and 114c. Contact portion 55b has two tab portions 115 and 116 cutout and folded over defining a terminal receiving channel 117. Heat dissipation portion 55c, which is generally rectangular in shape, has a central aperture 118 formed therein.

Figure 25:
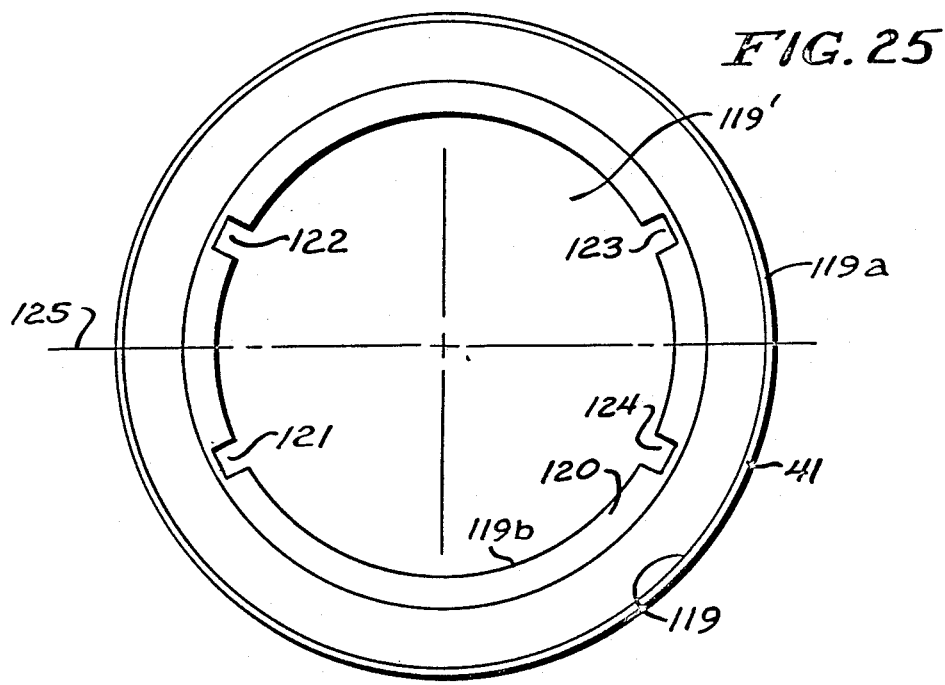
FIG. 25 is a top plan view of the lens for the switch assembly.
Figure 26:
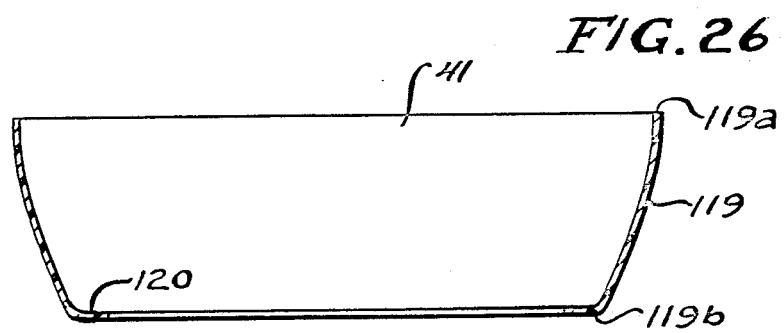
FIG. 26 is a vertical section view of the lens.

Referring to FIGS. 5, 25 and 26, the lens 41 is a one-piece, generally bowl shaped member made of an infrared pervious material such as Polymethylpentene. The lens has its side wall 119 tapering downwardly and inwardly from its upper edge 119a to its lower edge 119b. The bottom of the lens is provided with a central aperture 119' defining an inwardly extending annular flange portion 120 which is provided with 4 notches 121-124, each spaced 27° in arcuate length from an axis along line 125 in FIG. 25.

Referring to FIGS. 5, 8 and 9, considering the assembly of the components of the base sub-assembly, for contact 54, aperture 110 of the mounting portion 54a of the contact 54 is dimensioned to have an inner diameter to receive a rivet (not shown) which also passes through apertures 75 and 108 to locate the mounting portion 54a of the contact on the top 67 of the hub 64. The aperture 11 receives the tip 92 of contact support post 91.

Contact 55 has aperture 113 of its mounting portion 55a dimensioned as to its inner diameter to receive a rivet (not shown) that also passes through apertures 74 and 107. Also, the depending contact portion 114a is dimensioned to correspond to the dimensions of rectangular aperture 76 in top portion 67 of the hub 64 to locate contact 55 on the hub 64. Aperture 118 in heat dissipation portion 55a is received by the tip of contact support post 90 (FIG. 8). The channel 117 of contact 55 receives the terminal mounting lug 56a of triac 56 (FIG. 5) which has its leads 56b-56d connected to the under side of the printed circuit board 51 as by soldering.

Figure 7:
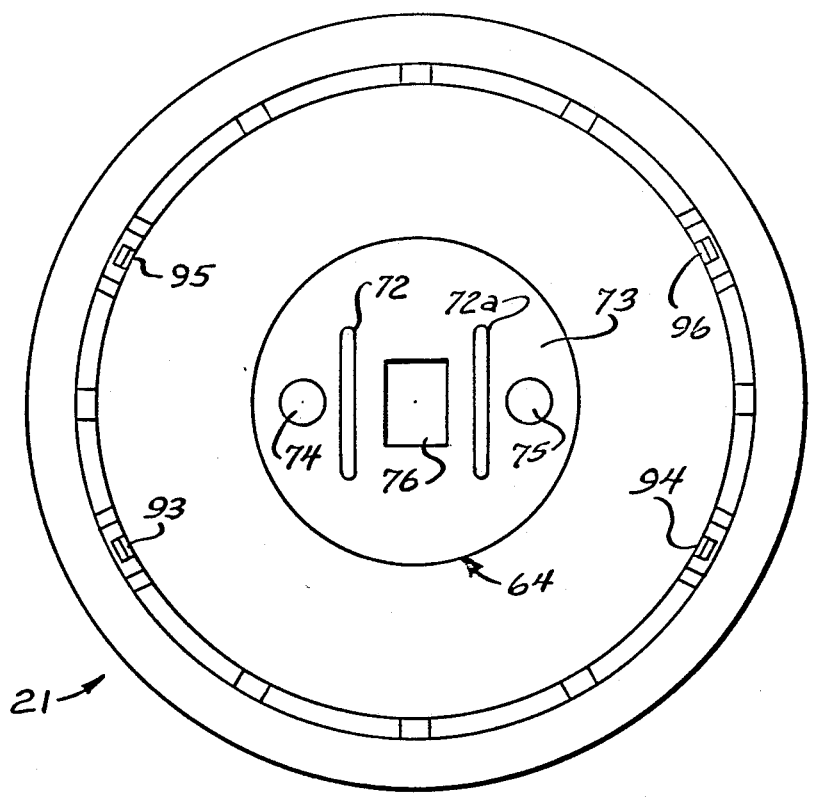
FIG. 7 is a bottom plan view of the housing base.

Referring to FIGS. 5, 5A and 7, the female connector 26 is received in the chamber 68 at the bottom central portion of the housing. Slot 106 receives projections 72 and 72a in the bottom surface 73, aligning the apertures 107 and 108 with apertures 74 and 75. The connector 26 is secured to the base 21 by rivets (not shown) 77 which extend through the aligned apertures, securing the female socket 26 and also the contact 54 to the central hub 64 of the base 21. Cantilever portion 55a provides resilient suspension mount for contact portion 114. In the base sub-assembly, contact 54 is the neutral contact and contact 55 extends the power out connection from the electronic circuit to the female connector 26 via its contact 114.

Referring to FIGS. 5, 8-10 and 25-26, the lens 41 is received on the base 21 with its inner flange 120 resting on shoulder 85a. The notches 121-124 are aligned with the four extensions 93-96 of the base 21, providing clearance for the extensions, the hook portions of which project above the base as shown in FIG. 6.

Cover Sub-assembly

Referring to FIG. 5, the cover sub-assembly includes the cover 22, the male connector 25 and contact 53.

Referring to FIGS. 12-17, the cover 22, which is of the same material as the base 21, has a hub portion 131, a disc shaped portion 132 and an annular skirt portion 133 depending from disc portion 132. Hub portion 131 includes a frustoconical top portion 134, an annular shoulder 135 and an annular vertically extending wall portion 136 which extends between the annular shoulder 135 and the disc portion 132 of the cover 22.

Hub 131 defines two vertical slots 138 and 138a the top portion 134 thereof. A pair of projections 140 (FIG. 12) extend upwardly from the shoulder 135 at diametrically opposed positions therealong for staking the male terminal 25 (FIG. 5) to the cover 22. Four trapezoidal cutouts 137 are provided in the vertical wall portion 136 of the hub 131. One of the cutouts receives the contact portion 54a of the neutral contact 54 (FIG. 5) in the assembled unit. The outer surface of the disc portion 132 is provided with two concentric slots 139 and 139a therethrough, which permit the passage of air upwardly and out of the housing through the vented cover. The slots 139, 139a divide the disc shaped portion 132 into three concentric ring sections 132a, 132b, 132c which are held together by a plurality of radially extending ribs 140 on the undersurface 141 of the disc 132. The ribs 141, twelve in the exemplary embodiment, bridge the slots 139, 139a interconnecting the three concentric ring sections 132a-132c.

Figure 12:
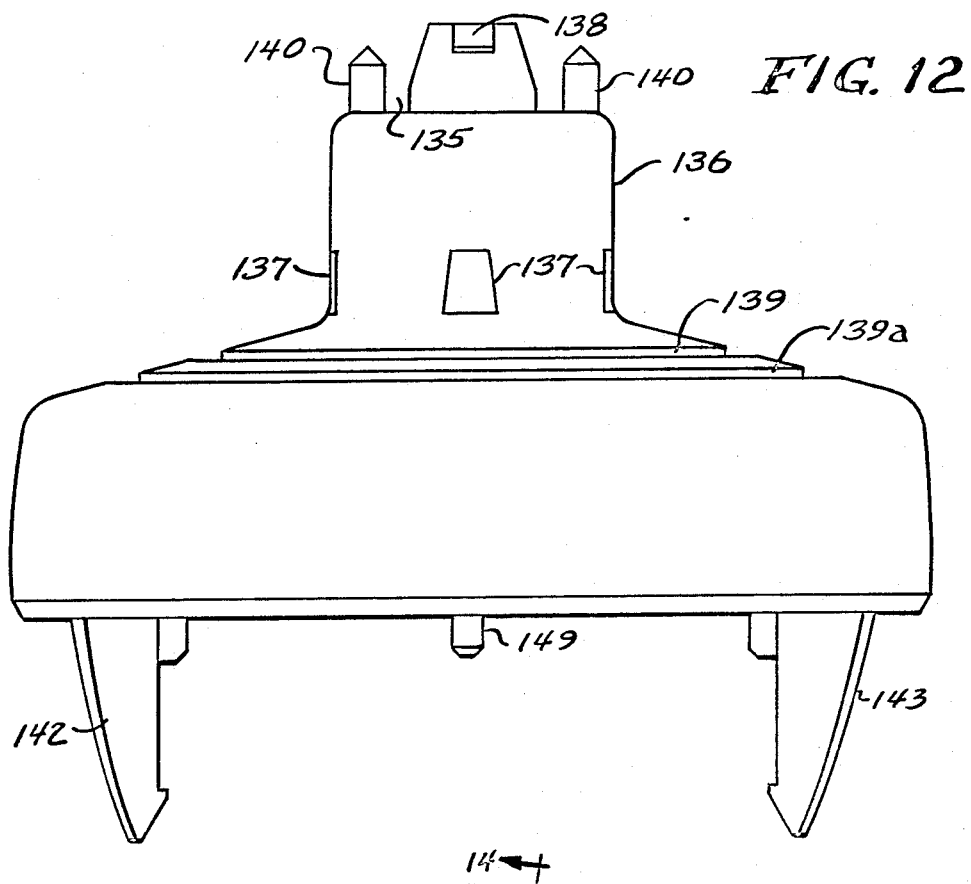
FIG. 12 is a side elevational view of the housing cover of the switch assembly.
Figure 13:
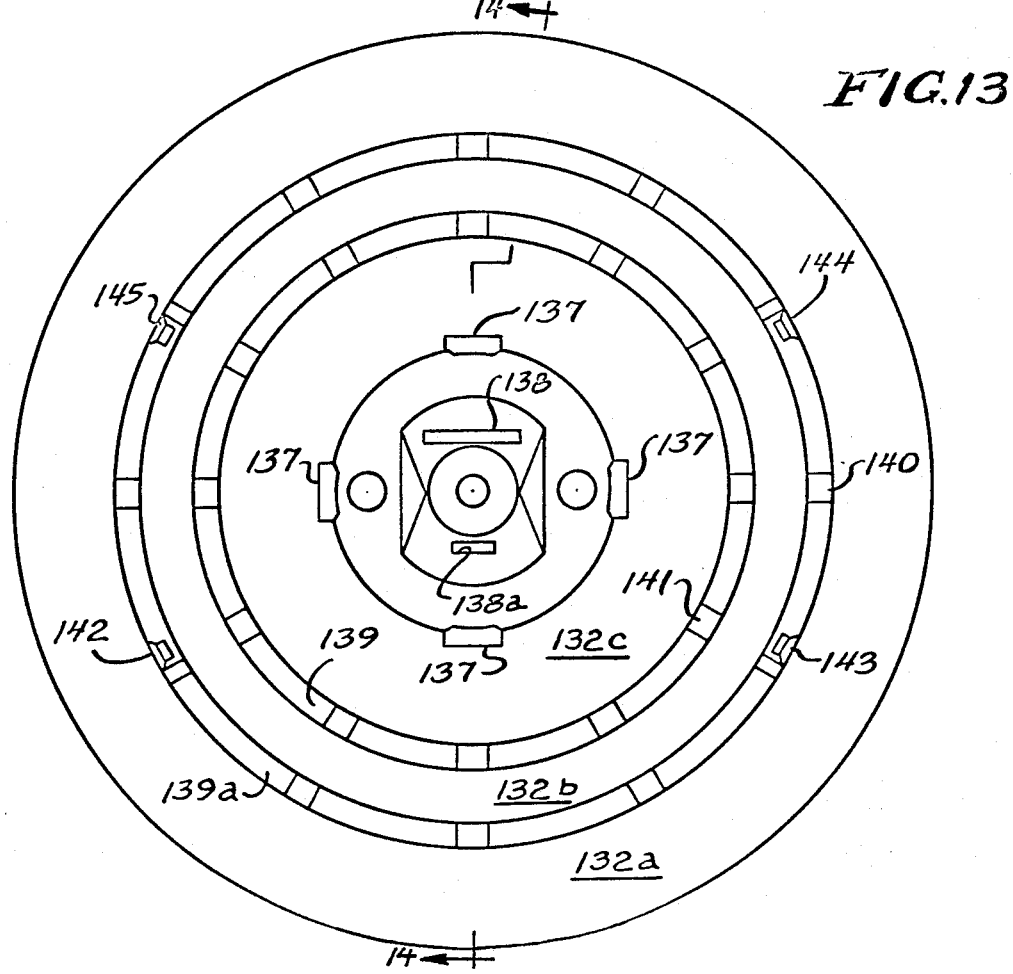
FIG. 13 is a top plan view of the housing cover of the switch assembly.

The cover 22 has four depending legs 142-145 as shown best in FIGS. 12 and 15. Each leg, such as leg 145 shown in FIG. 16, has a vertically extending inner edge 145a and a curved outer edge 145b terminating in a hook portion 145c at its distal end 145d. As shown best in FIG. 15, the four depending legs 142-145 are located 26° from longitudinal axis 148 of the cover, locating the four hook portions in alignment with the hook portion of the base (FIG. 5). Hook portions of the legs cooperate with corresponding hook portions of the base to lock the cover to the base.

As shown best in FIGS. 12, 15 and 17, the inner under surface 140 of the disc portion 132 defines two stepped projections 146 and 147, one of which 147 is shown in detail in FIG. 17. Each projection, such as projection 147 has a cutaway portion defining a shoulder 147a located at a position above in its downwardly projecting tip portion 147b. Projections 146, 147 engage mating surfaces on the optic shell as will be shown.

As best shown in FIGS. 12, 14, and 15, a generally cylindrical alignment peg 149 extends downwardly from the inner surface of disc portion 132 which is received in an alignment hole 169 in an upper surface of the optic shell 41 (FIG. 5).

Referring to FIGS. 14 and 15, the bottom edge of the cover is bevelled at 150. The inner wall surface at its bevelled edge 150 is cut back defining a notch 151 along the bottom inner peripheral wall of the cover, which receives the upper edge of the lens (FIG. 5) in the assembled unit.

Referring to FIGS. 5 and 5A, the male connector 25 is a generally cylindrical member having a top 153 which is provided with a central aperture 154 and two apertures 155 and 156 located in diametrically opposed positions along the outer periphery of the top 153. As shown in FIG. 5A, the outer side surface of connector 25 is provided with a conventional bulb thread 157.

Referring to FIG. 5, contact 53, which is of beryllium copper, has a vertically extending portion 53a which terminates at its upper end in a contact portion 53b and at its lower end in contact portion 53c. Upright portion 53a is generally rectangular in shape. Contact portion 53b is of a generally inverted U-shape projecting from the upper edge of portion 53a. Contact portion 53b includes a generally rectangular bias portion 160 extending at an angle relative to the vertical portion 53a and terminating in a tab portion 161.

In the cover sub-assembly, the male connector 25 is dimensioned to receive the hub portion 131 of the cover with the tip portion 134 thereof extending through central aperture 154 of the male connector 25 and with projections 140 extending through apertures 155 and 156. Projections 140 enable the male connector 25 to be staked to the cover.

The contact portion 53b of the contact 53 is threaded through the apertures 138 and 138a of the hub portion 131, locating the contact 53b exposed for contact in the aperture 154 of the male connector 25.

Optic Shell Sub-assembly

Referring to FIG. 5, the optic shell sub-assembly includes the optic shell 40, the sensor assembly 42, the printed circuit board 51 and triac 56, and the static shield 52.

Referring to FIGS. 18-21, the optic shell 40 is a one-piece molded unit of a rigid material having electrically insulating characteristics and which is metalized all over and conductive at line voltage, acting as a shield for sensor 43. One such material suitable for this use is CYCLOLAC AB5, commercially available from Borg-Warner. The shell 40 includes a generally elipsoidal central body portion 170 having opposing concave arcuate side surfaces 171, 171' connected together at corresponding ends by angled end walls 173 and 174 defining a central compartment 175. The end surfaces defined by the end walls 173 and 174 are generally V-shaped, providing side channels 176 and 177 at opposite sides of the optic shell 40, shown best in FIG. 20. An intermediate wall 180 extends along the lateral axis 180a (FIG. 18) of the optic shell 40, dividing the optic shell 40, in half defining two substantially identical portions for the optic shell 40, and corresponding parts have been given the same reference numeral, the reference numerals for one part having a prime notation.

Referring to FIG. 21, the wall 180 has flat planar members 181, 181' which are inclined inwardly from bottom to top at an angle cl. The top of the wall 180 rises to a peak defining flat surfaces 182, 182' extending toward one another and inclined inwardly at an angle d1 relative to a plane extending vertically through the wall 180. The center of the wall 180 is hollow defining a space 183 between the two members 181 and 181'.

Figure 18:
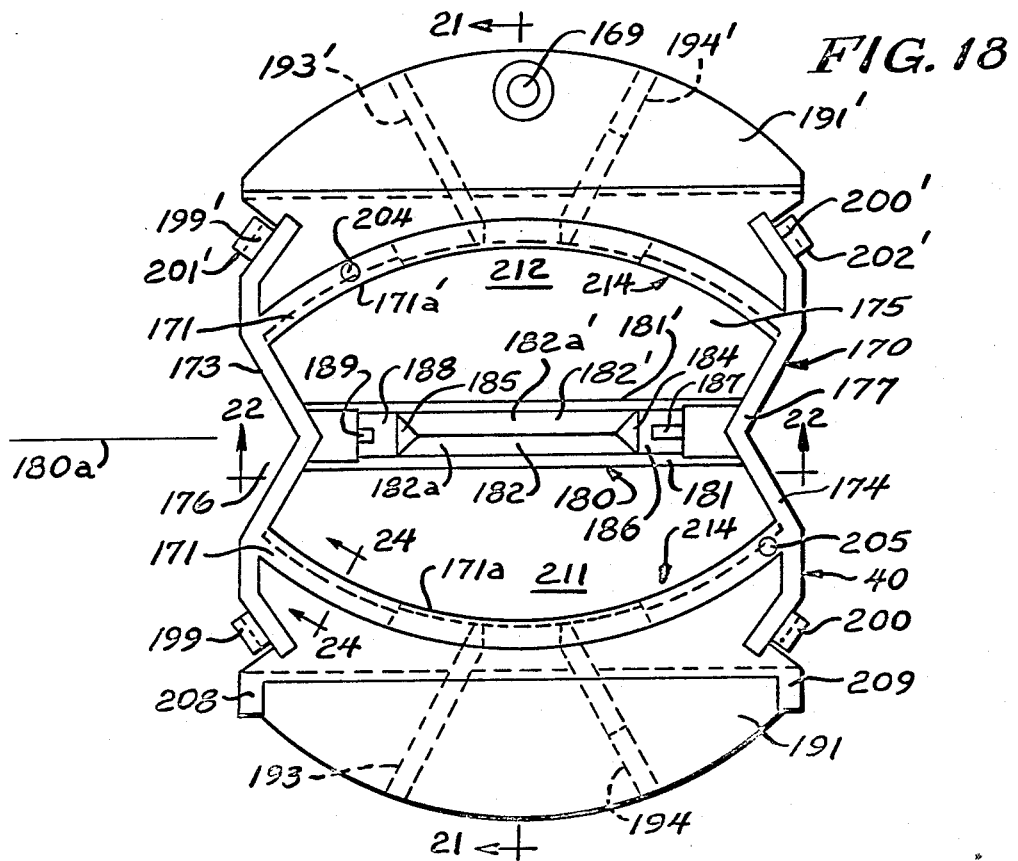
FIG. 18 is a top plan view of the optic shell of the switch assembly.

Referring to FIG. 18, the end portions 184 and 185 of the flat surfaces 182, 182' taper downwardly in a lateral direction defining a generally triangular end portion.

Referring to FIGS. 18 and 22, at the base of portion 184 there are provided index members including a generally U-shaped mounting shoulder 186 having a slot 187 extending axially of the wall 180. Similarly, at the base of portion 185 there are provided index members including a mounting shoulder 188 having a slot 189 extending along the longitudinal axis of the wall 180. Slot 187 is longer than slot 189.

Referring to FIGS. 18-21, the optic shell includes two apron-like members 191, 191', each generally semicrescent in shape with respective curved outer edges each apron having a pair of vanes such as vanes 193, 194 for apron 191 and vanes 193', 194' for apron 191'. As shown best in FIG. 19, each apron, such as apron 191, extends outwardly and downwardly from approximately midway of the vertical height of the optic shell 40 at an angle e1. The associated vanes 193 and 194 are generally rectangular but have an angular upper edge defined by the downward sloping apron from which they depend extend outwardly from one another at an included angle f1 and are formed integrally with and depend from the under surface 191a of the apron 191. The vanes 193 and 194 extend at an angle 0.5 f1 relative to a plane normal to the axis of the optic shell. Vane 194 has a notch 197 provided in the forward portion of its bottom edge which conforms to shoulder 101a (FIG. 8) of the base 21 in aligning the optic shell 40 in the base 21. A similar notch is provided on the bottom outer edge of vane 194' for engaging shoulder 100a (FIG. 8) of the base.

Figure 19:
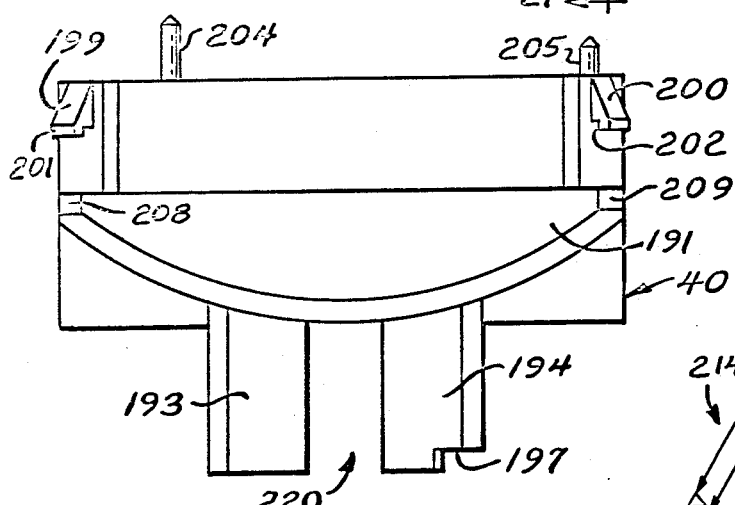
FIG. 19 is a front elevational view of the optic shell.

Referring to FIGS. 5, 18 and 19, end walls 173 and 174 include generally rectangular extension portions 199 and 200 which define downwardly extending hooks 201 and 202, at opposite ends of side surface 171. Similarly, further extensions 199' and 200' of end walls 173 and 174 define hooks 201' and 202' forward of side surface 171'. Hooks 201, 202, 201' and 202' are located near the upper edge of the optic shell as shown best in FIG. 5.

The upper surface of concave side surfaces 171 and 171' define vertically extending mounting posts 204 and 205, which extend above the upper surface of the optic shell 40 as shown best in FIG. 5 and serve to position the printed circuit board 51 (FIG. 5) to the upper surface of optic shell 40.

Referring to FIGS. 18 and 19, a pair of shoulders 208 and 209, provided at opposite ends of apron 191 at the forward sides of the optic shell 40, receive the projections 146, 147 (FIG. 15) depending from the underside of the cover 22.

Referring to FIGS. 18-21, the concave inner surface 171a of side wall 171, the planar generally vertical surface 181a and planar surface 182a of wall portion 180, the planar inner vertical surfaces 193a, 194a of vanes 193 and 194 and the planar under surface 191a of apron 191 are coated with a reflective material, defining one set of mirrored reflecting surfaces for the optic shell 40. Similarly, surfaces 171a' of side wall 171', surfaces 181a' and 182a' of wall portion 180, surfaces 193a', 194a' of vanes 193' and 194' and surface 191a' of apron 191' are coated with a reflective material defining a second set of reflecting surfaces for the optic shell 40. Preferably, the reflective material is aluminum and is applied to the optic shell 40 by vacuum deposition.

The two sets of reflecting surfaces of the optic shell 40 define the two optical systems, indicated generally at 211 and 212 in FIG. 18. The two optical systems provide non-coextensive 180° sensing fields in opposite directions such that the optic shell 40 provides a 360° field of view for the switch assembly 18 (FIG. 1). Referring to FIGS. 20 and 21, optical system 211 includes a planar mirror 213 defined by surface 181a, a focusing mirror 214 defined by surface 171a, a sensor reflecting mirror 215 defined by surface 182a and planar directing mirrors 216, 217 and 218. The directing mirror 216 is defined by surface 191a of apron 191. The directing mirrors 217 and 218 are defined by surfaces 193a and 194a of the vanes 193 and 194.

Similarly, optical system 212 includes planar mirror 213', focusing mirror 214', sensor reflecting mirror 215', and directing mirrors 216', 217' and 218' defined by respective surfaces 181a', 171a', 182a', 191a', 193a', and 194a'.

Referring to FIG. 21, the metalized surfaces 181a and 181a' of wall 180 define a double-sided planar mirror which reflects incoming infrared radiation onto the focusing mirrors 214, 214'. The metalized surfaces 182a and 182a' reflect focused infrared radiation directed thereto from corresponding focusing mirrors 214, 214, onto the sensor. The use of the sensor reflecting mirrors 215, 215' allows the use of a common sensor for the two optical systems 211 and 212.

In one optic shell for the exemplary embodiment, the surfaces 181a, 181a' are 1.3875 inches in length and 0.652 inches in height and surfaces 182a, 182a' were 0.787 inches in length along the bottom edge, 0.750 inches in length along the top edge, and 0.125 inches in their vertical extent. The angle of inclination c1 for surfaces 181 and 181' is 3° and the angle of inclination d1 of surfaces 182 and 182' is 30°.

Referring to FIG. 21, the hollow center 183 minimizes the effects of heat during molding on the wall 180 which defines the planar receiving mirrors 213, 213' and the sensor focusing mirrors 215, 215'. Otherwise such effects could cause distortion of the mirrored surfaces by warping or the like if the wall 180 were a solid member.

Figure 24:
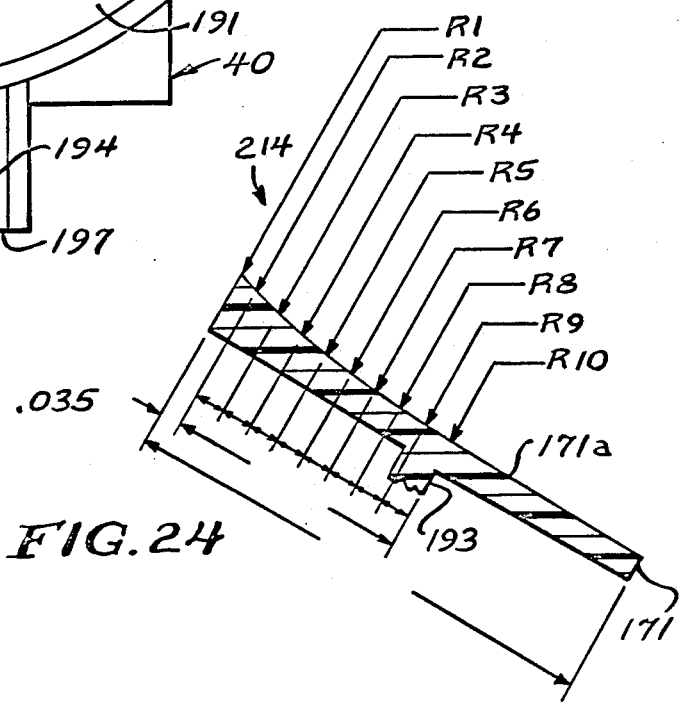
FIG. 24 is an enlarged fragmentary sectional view taken along the line 24—24 of FIG. 18.

Referring to FIGS. 18, 21, and 24, each of the focusing mirrors 214, and 214' is a parabolic surface of revolution. As shown in FIG. 24, surface 171a is curved along its vertical extent in eight steps between radii R1-R10, which in the exemplary embodiment were each approximately 0.05 inches in arcuate length providing an overall vertical height of 0.4 inches. The radii are in the horizontal plane. The radii are all blended in the vertical plane. By way of example, in the exemplary embodiment which was constructed, the radius of curvatures (in inches) at points R1-R10 is as follows: R1=1.25; R2=1.61; R3=1.274; R4=1.284; R5=1.293; R6=1.300; R7=1.305; R8=1.309; and R9=R10=1.311. The radius of curvature in the horizontal plane is 1.351 inches. A chord drawn between the edges of the mirror is 1.625" in length.

The lowermost segments in the optic shell, such as R6-R10, are greater in size than the upper segments R1-R5, because the rays are focused on the upper most segments, but not on the lower most segments. Each of the focusing mirrors 214, 214' is curved vertically and horizontally to focus the infrared rays at its center. The use of parabolic focusing mirror minimizes the size of the sensor required because the mirror focuses the rays before they are directed onto the sensor.

As indicated above, for the "look-out" field, infrared radiation is incident on the switch assembly at an angle of 20° in the exemplary embodiment. By virtue of the 3° inclination of the collecting mirrors 213, 213' the collecting mirrors reflect infrared radiation incident thereon onto respective focusing mirrors 214, 214' near the center axis thereof. Each focusing mirror 214, 214' focuses the infrared radiation along the horizontal axis of the associated sensor reflecting mirrors 215, 215', the radiation impinging on the 30° inclined reflecting mirror at an angle of 15°. Accordingly, there is a net 45° change in direction of the infrared radiation from the focusing mirror to the sensor.

As shown best in FIGS. 19-21, the vanes 193 and 194 which depend from the bottom of the optic shell 40, define an arcuate opening 220, angle f1, which in the exemplary embodiment is 56.25° in arcuate length. Opening 20 defines the center sensing field A1 (FIG. 3) for the "look-out" field (FIG. 1). The outer mirrored surfaces 193a and 194a of the vanes 193 and 194 define the inner limits of the secondary ranges B1 and B1' (FIG. 3). The vanes 193 and 194 are planar mirrors which direct rays outside of the center sensing field onto the planar mirror 13 which redirects the rays onto the focusing mirror 214 near its center point for focusing on the sensor via sensor reflecting mirror 215.

Similarly, vanes 193' and 194' define arcuate opening 220' which defines sensing field A2. The mirrored surfaces 193a' and 194a' of the vanes define the inner limits of fields B2 and B2'.

The planar directing mirror 216 extends at angle e1, which for the exemplary embodiment is 38° downwardly relative to a horizontal plane through the optic shell 40. In the exemplary embodiment, the radius of curvature of the peripheral edges 192 and 192' is 1.235 and the maximum lateral width of the members 191, 191' is 0.915 inches.

The directing mirror 216 (and 216') redirects infrared radiation in the vertical "look-down" field (FIG. 1) incident on the directing mirror 216 (216') at an angle of 56° to the planar collecting mirror 213 (and 213') of optical system 211 (and 212), the radiation being reflected off the 38° inclined directing mirror at an angle of 20°, for direction via collecting mirror 213 (213') to the focusing mirror 214 (and 214') and thence to the sensor via sensor reflecting mirror 215 (and 215').

Sensor Assembly

Figure 29:
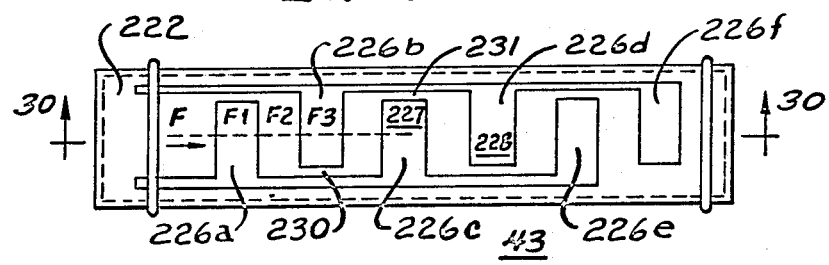
FIG. 29 is a plan view of the sensor of the switch assembly.
Figure 30:
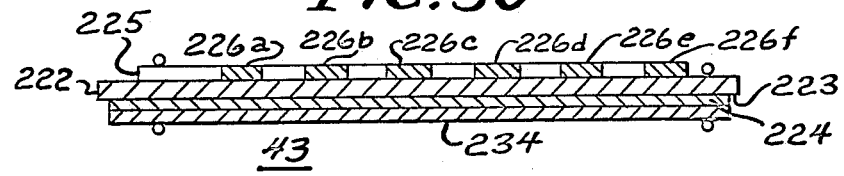
FIG. 30 is a sectional view taken along the line 30—30 of FIG. 29.

Referring to FIGS. 29 and 30, the infrared sensor 43 comprises a pliable pyroelectric film material 222 such as polyvinyldine fluoride (PVF2) which forms the base substrate for the sensor. The surface 223 of the pyroelectric material 222 which is designated as the front of the sensor is essentially covered with a continuous overlay 224 of an electrically conductive material which forms an electrostastic shield and a solid electrode for one side of the radiation sensor.

Through masking, the alternating electrode pattern is formed on the rear surface 225 of the pyroelectric material 222 by covering the surface in those areas left bare, providing the alternate electrode configuration which is desired for ambient temperature compensation in the sensor and the varying output signal which can indicate radiation source movement. The electrode arrangement provides six enlarged fingers 226a-226f, alternate fingers 226a, 226c, and 226e interconnected in electrical series by conductor 230 to form one electrode 227 and fingers 226b, second electrode 228.

A layer or coating of material 234 is applied to the front of the sensor which is the outer surface of the solid electrode 224. This coating is selected from a group of selective absorbing materials which provide the desired filtering characteristic. The material selected is essentially transparent or invisible to all wavelengths which are outside of the desired energy range to be sensed. This material can be any suitable material such as Mitrocellulose, urethane, styrene or acrylic, which can be selected for the desired narrow band of energy absorption range of 5 to 15 microns which is the range of heat energy which is given off by a human body. Clear lacquer, such as nitrocellulose, has this characteristic and exhibits the ability to absorb radiation in at least this narrow wavelength band. Thus, the application of a layer of clear lacquer on the outer surface of the continuous electrode 224 provides the desired function of sensing radiated energy which lies within the desired wavelength band strikes the outer surface of the clear transparent layer 234. Due to he absorption characteristic of this layer the radiated energy is converted into heat energy by the material. All other extraneous energy outside of this selected band passes through this layer and is again reflected back into the atmosphere where it is dissipated. With the focusing of the energy striking the surface of the filter layer 234 significant localized heating is created in the filter layer which is transferred by conduction quickly into the metallic electrode 224 and from there into the surface of the pyroelectic material 222. This localized heating of the pyroelectric material 222 causes a differential electric charge to be formed on the adjacent surface of the pyroelectic material which is picked up and conducted by the continuous electrode 224 and corresponding electrode 227 or 228.

The infrared sensor is arranged in an elongated rectangular configuration so that energy striking the mirror is focused on the surface of the sensor generally along its longitudinal axis as the source of radiation moves within the sensing field.

As a source of infrared energy in the horizontal plane that is being observed, passes in front of the mirror, a varying output signal from the sensor is generated. As the focused energy is aligned with one set of electrodes 227 or 228, the output voltage from that set of electrodes will be increased generally in a positive direction and the output from the other electrode set will remain essentially constant. The six electrode "fingers" define six sensing zones for each sensing field A, B1, B1' (A2, B2, B2'). The optical systems reverse the direction of the sweep of the focused radiation when the radiant energy is directed to the outermost "fingers" 226a and 226f. As the focused energy is directed between the two electrodes 227, 228, a minimum output signal is provided by the sensor these intermediate areas thus defining the "spaces" 31, 32 (FIG. 3) between sensing zones, such as N1, N2 and N2, N3, etc.

Referring to FIG. 29, as the energy source moves to the left, for example, the localized focus F of the energy on the surface of the sensor moves to the right to point F1 as illustrated and the output voltage from electrode 227 (i.e. finger 226a) will increase. As the focus point of the energy moves across the sensor in the axial direction away from point F1, the output from the electrode 227 returns to the original voltage. The output voltage from the other electrode 228 (i.e. finger 226b) will progressively increase as the focus point of the energy moves toward point F2 and approaches finger 226b of this electrode. As the focus point crosses electrode 228 and moves toward point F3, the output from the electrode 228 will again return to its original voltage with an increase again being observed in the voltage output for electrode 27 as the focus point of the energy approaches finger 226c.

Figure 27:
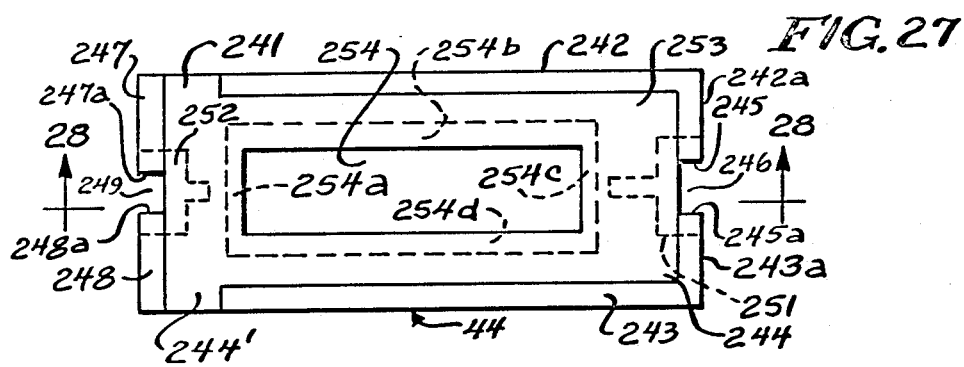
FIG. 27 is a top plan view of the sensor holder.
Figure 28:
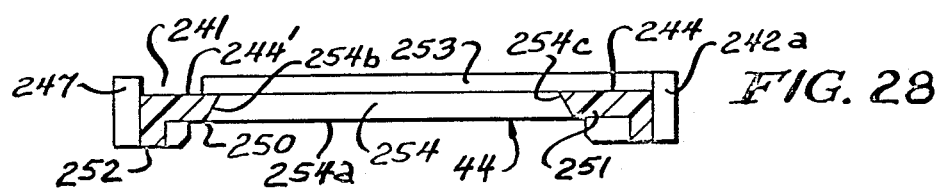
FIG. 28 is a vertical section view taken along the line 28—28 of FIG. 27.

Referring to FIGS. 5, 27 and 28, the sensor holder 44 is a generally rectangular member of a rigid electrical insulating material, such as material commercially available under the trade name CYCOLAC AB5. The holder 44 has a flat base portion 241, a pair of side walls 242 and 243, extending upwardly from the base portion 241 along the side peripheral edges thereof and having end wall segments 242a, 43a extending toward one another along one end 244, with their ends 245 and 245a spaced apart from one another defining a gap 246 therebetween. At its other end 244', the holder 44 has a pair of end wall portions 247 and 248 which have their ends 247a and 248a spaced apart from one another defining a gap 249 therebetween.

The under surface 250 of the holder 44 has a T-shaped depending portion 251 at one end 244 and a depending T-shaped portion 252 at its other end 244'. The projections 251 and 252 are aligned with corresponding gaps 246 and 249, defining index members which cooperate with the complementary index member 186-189 (FIGS. 18,22) on the upper edge of the optic shell 40 to locate the sensor assembly thereon.

The base portion 241 has a central aperture 254 rectangular in shape and the peripheral wall portions 254a-254d of which taper inwardly and upwardly from the undersurface 250 and are dimensioned to correspond to the 45° taper of mirrored surfaces 182a, 182a' (FIG. 21) of the optic shell.

Referring to FIG. 5, the frame 45 is a flat generally rectangular member with a central aperture 256 corresponding in dimensions to aperture 254 in the holder 44. The outer dimensions of the frame 45 correspond to the dimensions of the sensor 43 and to the recessed area 253 of the holder 44.

The connector 46 is a conventional Zebra connector which connects the conductors of the sensor 43 to printed circuit conductors (not shown) on the under side of the printed circuit board 51. The printed circuit board 51 is a generally octagonal shaped member as illustrated in FIG. 5, carrying circuit components (not shown) on its upper surface, and interconnecting printed circuit conductors on its lower surface.

The static shield 52 is a generally octagonal shaped member having a flat upper surface 260 from which depend two apertured tubs or lugs, one of which 261, is shown in FIG. 5 and a pair of side wall members one of which 262 is shown in FIG. 5. A generally rectangular aperture 263 is provided in the upper surface 260 at the central portion thereof through which passes the terminal end 161 of contact 53 to facilitate connection to the circuit contained on the printed circuit board 51.

Referring to FIGS. 5, 18 and 27-28, in the assembled optic shell sub-assembly, the sensor frame 45 is received in the recessed area 253 on the upper surface of the holder 44. The infrared sensor 43 is supported on the frame 45. The sensor sub-assembly 42 thus assembled is received on the upper surface of wall portion 180 (FIG. 18) with the slots 189 and 187 on the top edge of the optic shell receiving projections 251 and 252 on the underside of the sensor holder 44 (FIG. 27). The elongated slot 187 and corresponding projection 251 in the holder assure proper orientation of the sensor relative to the optic shell.

The tapered peripheral edge surfaces 254a-254d of the holder center aperture 254 conform to the tapered mirrored surfaces 182, 182' and tapered end surfaces 184 and 185 of wall 180 (FIG. 18) to locate the sensor reflecting mirrors 215, 215' in close proximity to the sensor 43 when the sensor assembly 42 is assembled in the optic shell 40.

Referring to FIGS. 5, 18 and 19, in assembling the printed circuit board 51 on the optic shell 40, the apertures 51a are aligned with alignment projections on the upper surface of the optic shell 40. The printed circuit board 51 is assembled with the optic shell 40 and static shield, with the sensor assembly 42 sandwiched therebetween. Zebra connector 46, which is located on the upper electrode bearing surface of the sensor 43, provides connections between the sensor electrodes 227, 228 and appropriate conductors (not shown) of the printed circuit board 51.

The static shield 52 is dimensioned to fit over the printed circuit board 51 with its two depending apertured tabs, such as tab 261, received by two hooks 199 and 200, on the optic shell 40. The static shield 52 encloses the sensor within the upper portion of the optic shell 40.

Referring to FIGS. 5, 8, and 18-21, in assembling the optic shell sub-assembly with the base sub-assembly, the bottom edges of the four vanes 193, 194, 193', and 194' of the optic shell are received by and supported on respective projections 99, 100, 98 and 101 of the base 21, supporting the optic sub-assembly above the central hub 64 of the base 21. This locates the vanes 193, 194, 193', 194' behind the lens 41. Side channels 176 and 177 of the optic shell 40 are aligned with contacts 55 and 56, respectively, which project upwardly from the base 21 and are supported in a generally vertical orientation by posts 91 and 90, respectively. Contact 54 extends ground connection around the metalized and conductive optic shell 40 from the center hub 151 (FIG. 5) on the cover where it is connected to the male socket 25 to the female connector 26 mounted in the cavity 68 (FIG. 9) in the underside of the base 21. Triac 54 has its terminal mounting lug 56a received in the mounting channel 117 of switched contact 55, the Triac 56 extending along the side channel 176, providing the power output connection between the circuit and the output connector 26 of the switch assembly in the assembled unit.

Referring to FIGS. 5, and 5A, in assembling the cover sub-assembly on the thus assembled base sub-assembly and optic shell sub-assembly, the cover 22 is aligned with the base 21 such that the hook portions of its downwardly projecting legs 142-145 are aligned with the four hooks 93-96 which extend upwardly from the base. As the cover is mounted on the base, the upper edge 119 of the lens 41 is received by the annular notch 151 formed in the lower edge 150 of the cover 22 as shown in FIG. 5A. Stepped projections 146, 147 (FIG. 15) on the under surface of the cover engage shoulders 208 and 209 on the upper surface of the optic shell and pin 149 (FIG. 15) which projects downwardly from the undersurface of the cover is located in aperture 169 in the upper surface of optic shell 40. The hook portions on the bottom of depending legs 142-145 snap into place on the hooked portions of the extensions 93-96 to secure the cover to the base. The contact tab 113 of contact 54 of the base sub-assembly is received through aperture 137 in the hub portion of the cover and in engaging relation with the conducting inner surface of the male connector 25 secured to the outer surface of hub 131 of the cover.

When the thus assembled switch unit is screwed into a conventional light bulb socket 24 (FIG. 2), a hot wire connection is made through contact 53 between the hot wire of the power source and the circuit. Contact 54 extends ground or neutral from the power input connector 25 to the power output connector of light bulb socket 26. Switched contact 55 extends the hot line potential to the hot terminal of the light bulb socket 26 when the triac is conducting. Locating the sensor in the upper portion of the housing and the light bulb receiving socket on the bottom of the housing provides maximum separation between the sensor and the lamp controlled thereby while allowing such lamp to be operatively received by the housing mounted socket.

Control Circuit

Figure 33:
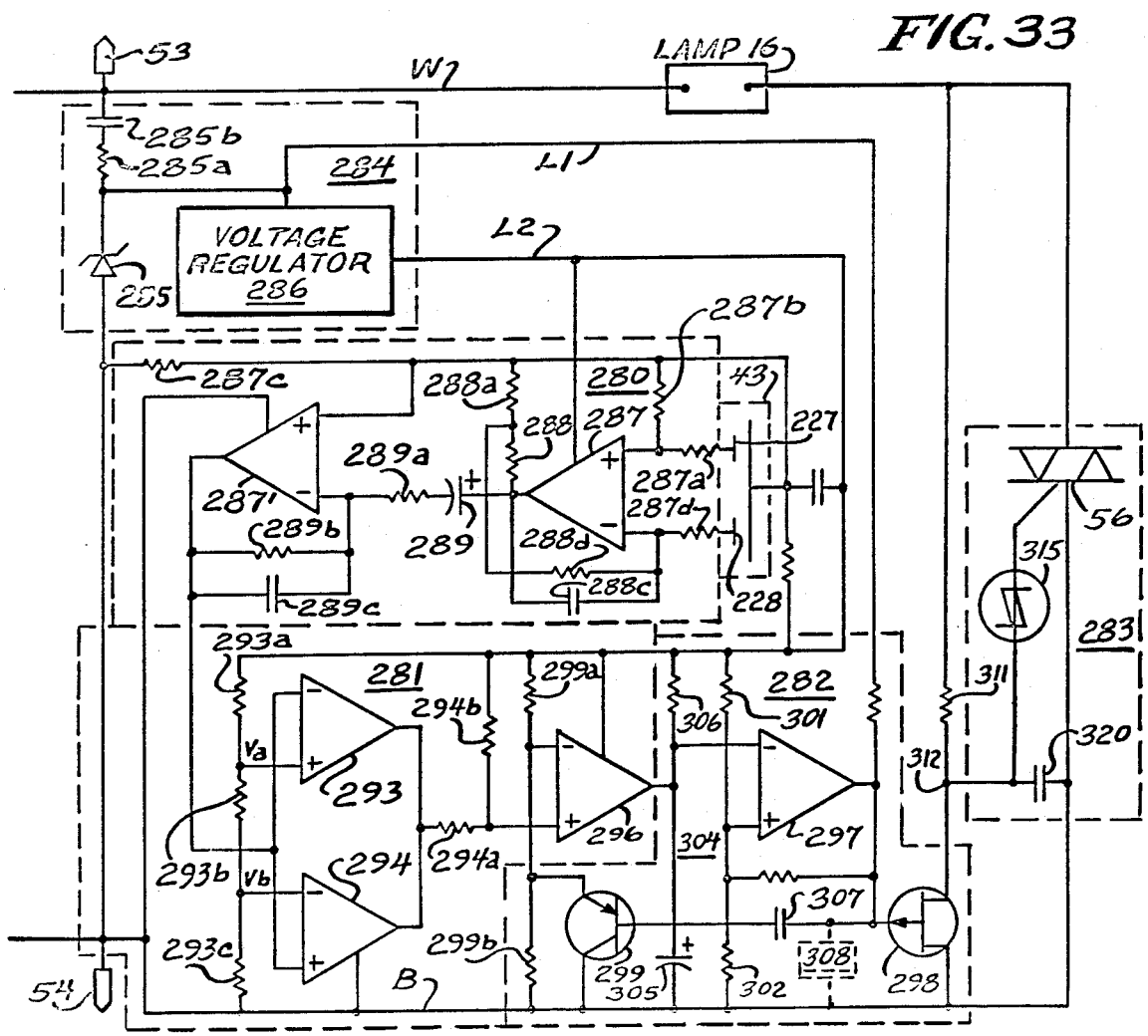
FIG. 33 is a schematic circuit diagram for the control circuit of the switch assembly.

Referring to FIG. 33, the control circuit includes an input stage 280, a comparator stage 281, a drive stage 282, an output stage 283 and a power supply stage 284.

The power supply stage 284 includes a 24 volt Zener diode 285 connected in series with a resistor 285a and a capacitor 285b between the conductor B connected to the ground contact 54 and conductor W connected to the hot contact 53, providing an unregulated voltage at 24 VDC. This voltage is applied to a conductor L1 and to a voltage regulator 286 which applies a regulated DC voltage at 12 VDC to a conductor L2.

The sensor 43 is connected to the input stage 280 which comprises a pair of operational amplifiers 287 and 287' which are connected in tandem for operation as a low pass filter to filter out 60 Hz noise. Amplifier 287 has its non-inverting input connected through a resistor 287a to sensor electrode 227 and through resistor 287b and a further resistor 287c to the ground reference. The inverting input of amplifier 287 is connected through a resistor 287d to electrode 228 of the sensor 43. The output of amplifier 287 is connected through resistors 288 and 288a and through resistor 287c to the ground reference and is connected through a feedback network including a capacitor 288c to the inverting input of the amplifier 287. The inverting input of amplifier 287 is also connected through a resistor 288d to the junction of resistors 288a and 288b. The output of the amplifier 287 is also coupled through a capacitor 289 and a resistor 289a to the inverting input of the amplifier 287' which has its non-inverting input connected through resistor 287c to the ground and its output connected through parallel connected resistor 289b and capacitor 289c to the inverting input of the amplifier 287'.

The output of amplifier 287' of the input stage 280 is connected to the input of the comparator stage 281 which is comprised of a pair of comparators 293, 294 and 296 connected for operation as a window comparator circuit to provide an output indicative of whether or not the input signal provided by the sensor 43 is within a predetermined range.

The output of amplifier 287' is connected to the inverting input of comparator 293 and to the non-inverting input of comparator 294. A voltage divider comprised of series connected resistors 293a, 293b, and 293c, is connected between conductor L2 and ground establishing reference voltages Va and Vb at respectively the non-inverting input of comparator 293, which is connected between the junction of resistors 293a and 293bb, and the inverting input of comparator 294, which is connected between junction of resistors 293b and 293c. The outputs of comparators 293 and 294 are commonly connected through a resistor 294a to the input of comparator 296 and through a resistor 294b to conductor L2. Comparator 296 has its inverting input connected to a voltage divider formed by resistors 299a and 299b which are connected in series between conductor L2 and ground. Drive stage 282 includes comparator 297, field effect transistor 298 and control transistor 299. The output of comparator 296 is connected to the inverting input of comparator 297 which has its non-inverting input connected to a voltage divider reference provided by series connected resistors 301 and 302 which are connected between conductor L2 nd ground. The output of comparator 296 is also connected to a time reference network 304 comprised of a capacitor 305 and a resistor 306 which are connected in series between conductor L2 and ground. Capacitor 305 provides a time delay shutoff feature to maintain the drive stage enabled for a time interval, such as four minutes, following termination of detection of infrared radiation by the input stage.

The output of comparator 297 is connected to the gate of the field effect transistor 298 which has its source-to drain circuit connected in series with a resistor 311 between the line input at the conductor W connected to the hot wire contact 53 through the lamp 16 and the conductor B connected to the ground contact 54. Control transistor 299 has its emitter connected to the junction of resistors 299a and 299b, its collector connected to ground and its base coupled through a capacitor 307 to the gate of field effect transistor 298. Optionally, photosensor 308 may be connected between the gate of the field effect transistor 298 and ground.

The output stage 283 includes triac 56, a breakover device 315 and a capacitor 320. The triac 56 is connected in series with the lamp 16 between the conductor W connected to the hot contact 53 and the conductor B connected to the ground contact 54. The breakdown device 315 is connected between the gate of the triac 56 and the output of the drive stage 282 at point 312. The capacitor 320 is connected between the output of the drive stage 282 at point 312 and the conductor B connected to ground terminal 54.

Operation of the Switch Assembly

The manner in which the two optical systems 211 and 212 of the switch assembly focus infrared radiant energy present in its detecting fields onto the sensor 43 is described with reference to the simplified views of the switch assembly 18 with the radiation patterns illustrated in FIGS. 31 and 32. Both optical systems 211 and 212 operate in the same manner and thus, the following examples for a given optical system are also applicable to the other optical system.

Figure 31:
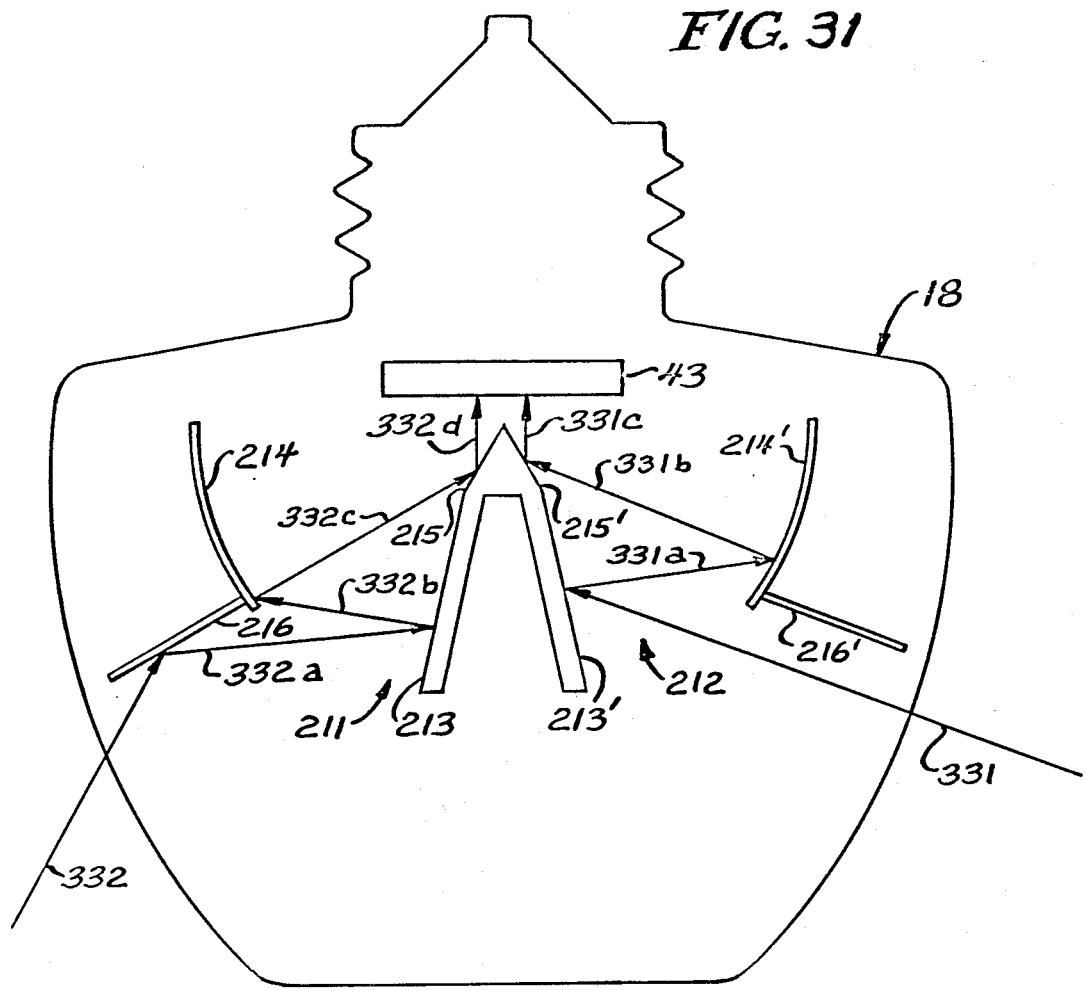
FIG. 31 is a simplified side view of the control switch assembly illustrating ray patterns.

Referring to FIG. 31, and in conjunction with FIG. 2, the manner in which infrared radiation in the "lookout" field is described with reference to optical system 212. Infrared radiation, represented by ray 331, directed toward the switch assembly 18 at an angle of approximately 20° from the horizontal are reflected by the planar collecting mirror 213', as ray 331a, to the focusing mirror 214'. The focusing mirror 214' focuses the radiation as ray 331b onto the sensor reflecting mirror 215' which is located at the focal point of the focusing mirror 214'. The angle of incidence of ray 331b is 15° relative to the 30° inclined surface of reflecting mirror 215' which redirects the radiation onto the sensor 43, as ray 331c.

Infrared radiation in any of the six sensing fields in the "look-down" field (FIG. 2) is described with reference to optical system 211. Infrared radiation, represented by ray 332, directed toward the switch assembly 18 at an angle of approximately 56° from the horizontal, impinges on the vertical directing mirror 216. The radiation is reflected from the directing mirror 216 at an angle of 20° from the horizontal as ray 332a onto the planar collecting mirror 213. The planar collecting mirror 213 redirects the radiation incident thereon as ray 332b at an angle of incidence of 20°, to the focusing mirror 214. The focusing mirror 214 focuses the radiation, as ray 332c, on to the sensor reflecting mirror 215 which is located at the focal point of the focusing mirror 214. The reflecting mirror directs the radiation, as ray 332d, onto the sensor 43.

Figure 32:
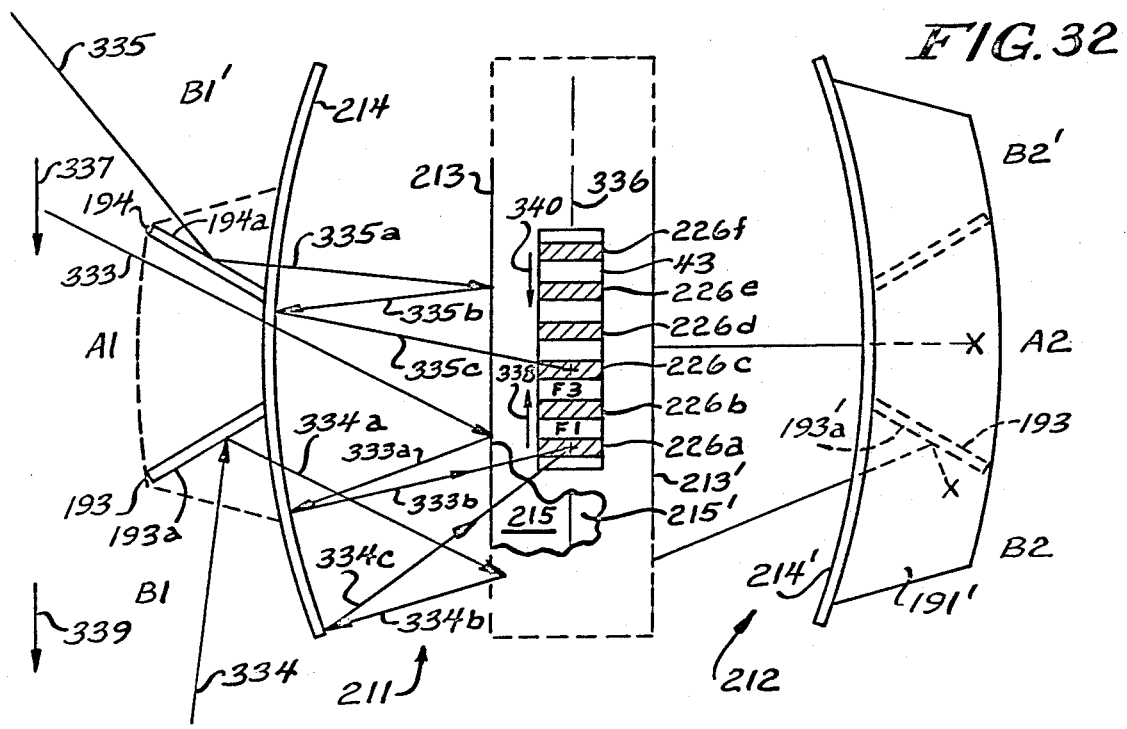
FIG. 32 is a simplified view looking upward from the bottom of the switch assembly illustrating the sensor and the mirrors which direct rays onto the sensor.

Considering now the operation of the optical systems 211 and 212 in receiving infrared radiation in the various sensing fields A1, B1, B1', A2, B2, B2', with reference to FIGS. 32 and 3, for infrared radiation, represented by ray 333, in the central sensing field A1 of the "look-out" field, for example, the optical system 212 operates in the manner of system 211 described above. The radiation passes between the unmirrored surfaces of the vanes 193, 194 and impinges on the planar collecting mirror 213. Planar mirror 213 redirects the radiation as ray 333a onto the focusing mirror 214. The focusing mirror reflecting mirror 215 at the center axis thereof redirects the radiation onto the sensor 43.

The operation is similar for infrared radiation greater than 56° off the optical axis received in either side sensing field B1 (or B2). However, the radiation represented by ray 334, first impinges on the mirrored surface 193a of the vane 193 and is reflected as ray 334a onto the planar collecting mirror 213 as if it were in the center sensing field A1 (or A2). Planar collecting mirror 213 redirects the radiation as ray 334b to the focusing mirror 214 which focuses the radiation as ray 334c onto the sensor reflecting mirror 215 which directs the radiation onto the sensor 43. Similarly, for infrared radiation −56° off the optical axis received in side sensing field B1' (or B2'), the radiation, represented by ray 335, first impinges on mirrored surface 194a of vane 194 and is redirected as ray 335a onto the planar collector mirror 213. Planar mirror 213 reflects the radiation as ray 335b onto the focusing mirror 214. The focusing mirror 214 focuses the radiation as ray 335c onto the sensor reflecting mirror 215 which redirects the radiation onto the sensor 43.

For the case where the infrared radiation is originating in the "look-down" field and is in any of the side sensing fields B1, B1', B2, B2', the operation is similar. However, the incoming radiation incoming at 56° is first redirected by the reflective surface of apron 191 or 191' to the mirrored surface of the vane for the side sensing field in which the radiation is present. For example, with reference to optical system 212 in FIG. 32, radiation in the "look-down" field of side sensing field B2 first is redirected by apron 191' to surface 193a' of vane 193', and thence to collecting mirror 213'.

Referring to FIG. 32, in all cases, the radiation is focused at the center line 336 of the sensor 43 to provide maximum signal output of the sensor 43. As the source of infrared radiation moves within range in the center field A1 of the sensing field in the direction of arrow 337, the radiant infrared energy is focused near the center point of the sensor and sweeps along a generally straight line in the direction of the arrow 338 from finger 226a to finger 226f. Dead zones occur when the rays are focused between adjacent pairs of the fingers 226a–226f of the sensor electrodes. When the source of radiation moves out of the center field A1 and into side sensing field B1, at arrow 339, the focused energy is swept across the sensor in the reverse direction (arrow 340) from finger 226f to finger 226a. The size of the electrodes, which basically operate under a piezocapacitive effect, defines the speed of response of the system to changes in movement within the sensing zones.

Circuit Operation

In operation with reference to FIG. 33, in the absence of infrared radiation, the field effect transistor 298 is maintained on providing a short circuit around capacitor 320, preventing the triac from being turned on. Thus, no AC current flows from the hot conductor W through the lamp 16. As long as capacitor 320 is short circuited by field effect transistor 298, triggering of the triac 56 is prevented and no current flows through the lamp 16. In the case where a photosensor control feature is provided, the photosensor 308 maintains the field effect transistor conducting, keeping capacitor 320 short circuited whenever ambient light level exceeds a selected level.

When infrared radiation is directed to the sensor through one of the optic systems 211 or 212 (FIGS. 31 and 32), as the source of the infrared radiation moves relative to the sensing fields, the focus point of the radiation is swept along the sensor 43 from finger to finger of the electrode. As the focus point first approaches point F1, the signal output of electrode 227 increases relative to that of electrode 228 resulting in an increase in the signal at the non-inverting input of amplifier 287. The output of amplifier 287 responsively increases with continued movement of the source of radiation in the same direction, and approaches point F3. This results in a time varying signal which is coupled through capacitor 289 to the inverting input of amplifier 287'. Capacitors 289 and 289c, and resistors 289a and 289b set the response time for amplifier 287' to the input signal to limit its response to signals varying at a rate greater than 60 Hz.

The signal output of amplifier 287' is applied to the inverting input of comparator 293 and the non-inverting input of comparator 294. When this signal is less than Va or greater than Vb, the reference voltages at the non-inverting and inverting inputs of respective comparators 293 and 294, the corresponding comparator provides a positive going output. Such output is coupled through resistor 294a to the non-inverting input of comparator 296, resulting in a positive going signal at the output of comparator 296. This signal, applied to the inverting input of comparator 297, decreases the potential difference between the non-inverting input and the inverting input of comparator 297, providing a decreasing signal at the output thereof. This signal turns off the field effect transistor 298, interrupting the shorting circuit path around the capacitor 320. Accordingly, the capacitor 320 can now charge during each cycle of the AC signal raising the potential at point 312 above ground potential. When this potential exceeds the breakover voltage of the breakover device 315, the triac 56 is triggered on energizing the lamp 16 with full power. Also, when the output of amplifier 296 becomes a logic high level, capacitor 305 charges.

As long as the source of infrared radiation continues to move within the sensing field, the signal applied to the input stage 280 continues to vary, maintaining the drive stage enabled to keep the field effect transistor 298 non-conducting. This enables the triac 56 to be turned on each cycle to keep the lamp energized.

When variations in infrared radiation cease to be detected by the sensor, the input stage will inhibit the comparator stage 281 causing its output to become logic low level. However, the charge on capacitor 305 maintains the potential at the non-inverting input of the output stage comparator 297 at logic high level for a discharge time determined by the time constant. The output of comparator 297 is maintained at logic low level for the time duration, defined by the discharge time for capacitor 305, maintaining the lamp 16 energized at full power during this time. When the capacitor 305 discharges sufficiently, comparator 297 switches its output to logic high level, enabling field effect transistor 298 to conduct providing a discharge path for the capacitor 320. This inhibits further enabling of the triac 56. Accordingly, the lamp 16 is deenergized.

Summary

Referring to FIG. 2 for the purpose of illustration the passive infrared actuated switch assembly 15 provided by the present invention has been described with reference to an application in controlling the energization of a ceiling-mounted light bulb. As has been described, the switch assembly housing is configured for installation in an existing ceiling mounted light bulb socket 24 and is provided with a light bulb socket 26 to receive the light bulb 16 which it controls.

With reference to FIGS. 2-4 and 31, the two optical systems 211 and 212 (FIG. 31) of the switch assembly sense radiation in a 360° range in horizontal planes. The sensing range includes two separate vertical fields of view including a shallow cone-shaped "look-out" sensing field (FIG. 3) and a more vertical cone-shaped "look-down" sensing field (FIG. 4) at a second smaller semivertical angle. The "look-out" field is divided into six "pie-shaped" sensing fields A1, B1, B1', A2, B2, B2', each 60° in arcuate length, with each sensing field subdivided into a plurality of sensing zones, such as sensing zone N1-N6 for sensing field A1, sensing zones N7-N11 for sensing field B1, and sensing zones N12-N16 for sensing field B1'. The "look-down" field is identical in shape to the "look-out" sensing field, and has the same projection in the horizontal plane as the "look-out" field, but extends downwardly at a smaller semivertical angle.

Referring to FIGS. 31 and 32, each optical system, such as optical system 211, includes a planar collecting mirror 213, a parabolic focusing mirror 214 and a planar sensor reflecting mirror 215 for directing radiation from the corresponding sensing field onto the sensor 43. For optical system 211, radiation from the "look-out" field of the center sensing field A1 passes directly between vanes 193 and 194 to the collecting mirror, whereas radiation in the side sensing fields B1 and B1' is reflected off corresponding vanes 193 and 194 which redirect the radiation to the collecting mirror. As has been described, the sensing element 43 is connected in the control circuit (FIG. 33). The circuit responds to variation in the output of the sensing element due to variation in infrared radiation, indicative of movement of a heat radiating body, such as a person, within the sensing range, to turn on the lamp. Radiation from the "look-down" field is directed to the collecting mirror 213 by mirror 216 for direction to the sensing element 43.

Referring to FIGS. 2, 3 and 32, when the person enters the room the person first moves within one or more of the sensing zones, (assumed to be sensing zones N3 and N4 of the center sensing field A1) of the "look-out" sensing field. Because the person is entering the room, the person's leg or foot will move into the sensing zones, and the infrared radiation emitted by the person's leg or foot is detected by optical system 211 and focused onto the sensing element 43. For the case where the person is moving directly toward the middle of the room, the infrared radiation is directed toward the center of the sensing range and passes between the vanes 193, 194. If the person moves on either side of center, the radiation is directed back to the center field by the mirrored surface 193a or 194a of the appropriate vane. The sensing element responsively produces an output which is applied to the control circuit (FIG. 33) to cause the lamp to be lit.

As the person moves into the room walking toward the middle of the room, and thus towards the switch assembly located thereat, and reaches the point about eight feet away from the center of the room, the person will have moved out of the "look-out" field. The person's infrared radiation is no longer be sensed in such field. However, the control circuit maintains the lamp lit. With continued movement, the person reaches the boundary of the "look-down" field, at five feet from the center of the room. As the person enters the "look-down" sensing field, the radiation is again sensed and is redirected by the mirror 216 from its steep vertical angle into the more shallow field of the "look-out" field for focusing onto the sensing element 43 by the optical system 211.

When the person reaches a point nearly directly beneath the switch assembly 15, again the person's infrared radiation is no longer sensed because of the dead zone of the "look-down" field. As the person continues walking through the room, passing beneath the switch assembly 15, and out of the dead zone, the person enters sensing zone N6' of the other optical system 212. Initially, the infrared radiation emitted by the person is present in the "look-down" field and is reflected by the vertical directing mirror 216' into the more shallow "lock-out" field of the optical system 212 for focusing on the sensor 43. With continued movement, eventually the person moves into the "look-out" sensing field. As long as the person continues moving within the room and within the sensing fields of the switch assembly, the person's infrared radiation is sensed, maintaining the lamp lit.

I claim:

1. An infrared radiation activated control switch assembly operable to energize an electrical unit and usable with an electrical socket comprising:

a housing;

means carried by said housing for engaging the electrical socket mechanically and electrically;

means carried by said housing, spaced from said socket engaging means, for at least electrically engaging the electrical unit;

means, carried by said housing, for sensing infrared radiation with said sensing means including means for collecting radiation incident thereon from a 360° degree region surrounding said housing; and control means coupled between said sensing means and said electrical unit engaging means, responsive to infrared radiation incident on said sensing means, for energizing the electrical unit.

2. An infrared radiation actuated control switch assembly as in claim 1 with:

said sensing means including a sensing element responsive to infrared radiation; optical means defining first and second independent optical systems;

said optical means supported within said housing and each said optical system including first reflecting means, second reflecting means and focusing means, said sensing means including mounting means mounting said sensing element in an operative relation with said focusing means, said first reflecting means responding to infrared radiation in a cone-shaped first sensing field at a first predetermined semivertical angle within the space, said second reflecting means responsive to infrared radiation in a cone-shaped second sensing field at a second predetermined semivertical angle within the space, focusing means focusing onto said sensing element, infrared radiation from associated first and second sensing fields reflect by said first and second reflecting means, said control means connected to said sensing element and responsive to said sensing element for providing an output for energizing the electrical unit in response to variation in infrared radiation focused onto said sensing element by either one of said optical systems, indicative of movement of a source of infrared radiation within the space.

3. A control switch assembly according to claim 2, wherein the functional device is a light bulb, said housing means including first connection means adapted to receive the light bulb and second connection means adapted to connect said control assembly to a source of power.

4. A control switch assembly according to claim 3, wherein said first connection means is located at the bottom portion of said housing means and said mounting means mounting said sensing element in the upper portion of said housing means.

5. A control switch assembly according to claim 3, wherein said first connection means includes socket means for receiving the light bulb, said second connection means includes a threaded terminal portion adapted to be received by a conventional light bulb socket, and contact means connecting terminals of said socket means and terminals of said threaded terminal portion to said circuit means.

6. A control switch assembly according to claim 5, wherein the light bulb socket is located in the center of a room near the ceiling thereof, said first reflecting means of said first and second optical systems are positioned to direct infrared radiation to said focusing means from plural sensing fields extending forwardly and rearwardly, respectively, of the assembly, and said second reflecting means of said first and second optical systems are positioned to direct infrared radiation to said focusing means from plural sensing fields extending beneath the assembly, each of the sensing fields having an angular extent of 180°.

7. A control switch assembly according to claim 2, wherein said housing means encloses said sensing means, said optical means and said circuit means therewithin and includes means defining an optical window of an infrared pervious material for passing infrared radiation into said housing means, said optical means supported within said housing means behind said optical window.

8. A control switch assembly according to claim 5, wherein said housing means comprises a base and a cover, constructed and arranged for assembly together with said optical means supported therewithin, the bottom surface of said base including a cavity in which said light bulb socket is mounted, and the upper surface of said cover including an upwardly extending hub portion with said threaded terminal portion contained thereon.

9. A control switch assembly according to claim 7, wherein said optical means comprises a one-piece shell member of an insulating material having surface portions thereof selectively metalized with a reflective metal providing said reflecting means and said focusing means for said two optical systems.

10. A control switch assembly according to claim 2, wherein said focusing means includes a planar collecting mirror, a concave focusing mirror and a reflecting mirror, said planar collecting mirror directing infrared radiation from said first and second reflecting means to said focusing mirror, and said reflecting mirror located at the focal point of said focusing mirror for reflecting infrared radiation focused by said focusing mirror onto said sensing element.

11. A control switch assembly according to claim 10, wherein said concave focusing mirror comprises a parabolic surface of revolution curved along mutually perpendicular axes thereof.

12. A control switch assembly according to claim 10, wherein said first and second optical systems monitor non-coextensive first and second sensing fields, respectively, each having an angular extent of 180° and each of said first reflecting means and each of said second reflecting means receiving infrared radiation in a center sensing field and first and second side sensing fields.

13. A control switch assembly according to claim 12, wherein said sensing element is constructed and arranged to define a plurality of infrared radiation sensing areas thereon whereby each of the sensing fields is subdivided into a plurality of sensing zones.

14. A control switch assembly according to claim 12, wherein said first reflecting means includes first and second members, each member generally rectangular in shape and having its longitudinal axis extending generally normal to the horizontal and having its lateral axis extending at an acute angle relative to the plane of said collecting mirror, said first and second members having first planar surfaces opposing one another and spaced apart from one another at an included angle in the range of 40° to 60°, defining said center sensing field between said opposing surfaces, and said first and second members having second planar surfaces having a reflective portion facing outwardly torward said first and second side sensing fields, respectively; infrared radiation from said center sensing field passing between said opposing surfaces of said members directly to said collecting mirror and infrared radiation from said first and second side sensing fields being reflected onto said collecting mirror by said second reflective surfaces of said members.

15. A control switch assembly according to claim 14, wherein said second reflecting means of said two optical systems each includes a third member having a planar surface with reflective surface portions for reflecting infrared radiation from said second sensing fields onto said collecting mirror.

16. A control switch assembly according to claim 12, wherein said optical means comprises a shell member having a hollow body portion ellipsoidal in shape with inner opposing arcuate walls, defining first and second focusing mirrors, means extending parallel to the longitudinal axis of said body portion and having first, second, third and fourth planar surfaces, said first and second planar surfaces facing said first and second focusing mirrors, respectively, for reflecting infrared radiation from associated sensing fields onto said focusing mirrors, and said third and fourth planar surfaces located at the focal points of said first and second focusing mirrors; respectively, for reflecting infrared radiation focused by said focusing mirrors onto said sensing element.

17. A control switch assembly according to claim 15, wherein said optical means comprises a one-piece shell member having a first plurality of pairs of reflective surfaces defining said collecting, focusing and reflecting mirrors for each optical system, and a second plurality of pairs of reflective surfaces defining said planar reflecting surfaces of said first, second and third members.

18. A control switch assembly according to claim 17, wherein said shell member is of an electrically insulating material selectively metalized with a reflective metal defining said plurality of reflective surfaces.

19. An infrared radiation actuated control switch assembly as in claim 1
   optical means defining first and second optical systems;
   said housing containing said sensing means, said optical means and said control means;
   said first optical system including a first planar collecting mirror, a first parabolic focusing mirror, and a first planar reflecting mirror, and said second optical system including a second collecting mirror, a second parabolic focusing mirror and a second planar reflecting mirror;
   said first and second collecting mirrors receiving infrared radiation impinging thereon from respective first and second sensing fields, located fore and aft of the assembly and from respective third and fourth sensing fields located below the assembly, each sensing field being on the order of 180° in angular extent, the sensing fields of said first and second collecting mirrors being non-coextensive, said first and second focusing mirrors being constructed and arranged to receive infrared radiation reflected thereto from associated collecting mirrors and to focus the infrared radiation at their respective focal points; and associated reflecting mirrors located at the focal points; said sensing means including an elongated multi-element sensing member positioned relative to said first and second reflecting mirrors to receive infrared radiation focused thereon;
   and said control means connected to said sensing member and responsive to said sensing member to generate a control output in response to detection of infrared rays in either of said fields of view.

20. A control switch assembly according to claim 19, wherein said first and second focusing mirrors are located opposing one another in a spaced relationship, said first and second collecting mirrors located between said focusing mirrors with respective reflective surfaces facing said first and second focusing mirrors, respectively, and positioned offset vertically downwardly relative to the associated focusing mirror and inclined from bottom to top away from the associated focusing mirror.

21. A control switch assembly according to claim 20, wherein said first and second optical system each include first and second directing mirrors constructed and arranged to define a center sensing field and first and second side sensing fields within said first and second sensing fields, respectively, infrared radiation present in said center sensing field impinging directly on said collecting mirror and infrared radiation in said first and second side sensing fields being redirected by associated first and second directing mirrors to said collecting mirror.

22. A control switch assembly according to claim 20, wherein said first and second optical assemblies each comprise a third directing mirror constructed and arranged to direct infrared radiation from beneath the assembly to said collecting mirrors for reflection to said focusing mirror.

23. A control switch assembly according to claim 22, wherein said third directing mirror for each optical system is located near the bottom edge of the associated focusing mirror and extends at an angle relative to the planar surface of the associated collecting mirror, and wherein said first and second directing mirrors for each optical system are located beneath said third directing mirror and extend downwardly in a generally vertical direction and have planar reflective surfaces facing outwardly away from one another.

24. A control switch assembly according to claim 23, wherein said first and second planar reflecting mirrors are located above respective collecting mirrors and extend at a predetermined angle to a vertical axis of said collecting mirrors.

25. An infrared radiation actuated control switch assembly responsive to infrared radiation within a given space for controlling a functional device in response to variations infrared radiation, indicative of movement of a source of infrared radiation within the space, comprising
   sensing means including a sensing element responsive to infrared radiation, optical means, control circuit means; and housing means for containing said sensing means, said optical means and said control circuit means;
   said housing means constructed and arranged for mounting within the space;
   said optical means supported within said housing means and including first reflecting means defining a cone-shaped first sensing field at a first predetermined semivertical angle within the space and including a center sensing field and first and second side fields, and second reflecting means defining a cone-shaped second sensing field at a second predetermined semivertical angle within the space;
   said optical means including focusing means for focusing infrared radiation from said first and second sensing fields onto said sensing element,
   said first reflecting means including first and second members each generally rectangular in shape with its longitudinal axis extending generally normal to the horizontal and its lateral axis extending at an acute angle relative to the focusing means said first and second members having first surfaces opposing one another and spaced apart from one another at an included angle in the range of 40° to 60°, and having respective second surfaces with reflective portions facing outwardly toward said first and second side sensing fields, infrared radiation from said center sensing field passing between said opposing surfaces of said first and second members directly to said focusing means, and infrared radiation from said side sensing fields being reflected onto said focusing means by said reflective surfaces of said first and second members, and said second reflecting means including a third member having a planar surface extending generally normal to the vertical and having reflective portions therein;

said circuit means connected to said sensing element and responsive to said sensing element for providing an output for energizing the functional device in response to variation in infrared radiation focused onto said sensing element indicative of movement of a source of infrared radiation within the space.

26. An infrared radiation actuated control switch assembly responsive to infrared radiation within a space for controlling a functional device in response to variation in infrared radiation indicative of movement of a source of infrared radiation within the space, comprising infrared radiation sensing means; optical means defining first and second independent optical systems; control circuit means; and housing means for containing said sensing means, said optical means and said control circuit means;

said housing means constructed and arranged for mounting within the space;

said optical means including an optic shell supported within said housing and including a hollow body having first and second side walls, first and second end walls, and an intermediate wall, said end walls interconnecting said side walls near the ends thereof, said side walls having opposing concave reflective surface portions defining first and second focusing mirrors, said intermediate wall extending along the longitudinal axis of said body between said end walls and having first and second planar reflective surfaces facing said first and second focusing mirrors, respectively defining first and second collecting mirrors for said first and second optical systems, respectively, and positioned to reflect infrared radiation from the space onto said focusing mirrors, and said intermediate wall having third and fourth planar reflective surfaces facing said first and second focusing mirrors, respectively and located at the focal points thereof, defining sensor reflecting mirrors for said first and second optical systems, respectively, for reflecting infrared radiation focused by said focusing mirrors onto said sensing means, said circuit means connected to said sensing means and responsive to said sensing means for providing an output for energizing the functional device in response to variation in infrared radiation focused onto said sensing means indicative of movement of a source of infrared radiation within the space.

27. A control switch assembly according to claim 26, wherein said optic shell includes first and second radiation directing means each associated with a different one of said optical systems and each comprising first and second planar extensions of said body, each generally rectangular in shape and extending generally vertically and projecting outwardly from said body at one side thereof and at an angle to one another, the included angle therebetween being in the range of 40° to 60°, defining a center sensing field between said extensions and first and second side sensing fields, one on either side of said center sensing field, and said extensions having reflective surface portions facing said side sensing fields, whereby infrared radiation from said center sensing field passes directly to the associated planar reflecting surface and infrared radiation from said first and second side sensing fields is reflected onto the associated collecting mirror by the reflective surface portions of said extensions.

28. A control switch assembly according to claim 27, wherein said directing means further includes first and second members each extending in a generally horizontal plane outwardly from the body at opposite sides thereof, each having a planar surface with a plurality of reflective portions facing downwardly of the body, for reflecting infrared radiation from said sensing fields beneath the control assembly onto said first and second collecting mirrors.

29. A control switch assembly according to claim 26, wherein said intermediate wall includes first and second rectangular panels the outer surfaces of which having reflective portions inclined inwardly from the bottom edge to the top edge of said intermediate wall defining said first and second reflective surfaces and upper edge portion of said panels inclined inwardly at a predetermined angle and rising to a peak at the center of said intermediate wall, defining said third and fourth reflective surfaces.

30. A control switch assembly according to claim 29, wherein said sensing means comprises a sensing element and a holder having a recessed upper surface receiving said sensor and said intermediate wall having indexing means at its top edge located at the ends of said upper edge portions of said panels, said holder mounted on the top edge of said intermediate wall and having indexing means received by and complementary to said indexing means of said intermediate wall to locate said sensing element adjacent to said third and fourth reflective surfaces.

31. A control switch assembly according to claim 30, wherein said holder has a central aperture rectangular in shape through its recessed upper surface, said sensing element supported by its edges in overlying relationship with the aperture, and lower peripheral side edges of the aperture inclined at an angle corresponding to the angle of inclination of said panel upper edge portions to receive at least part of said upper edge portions within said apertures when said holder is mounted on said intermediate wall locating said third and fourth reflective surfaces in close proximity to the lower surface of said sensing element.

32. A control switch assembly according to claim 26, wherein said housing means encloses said sensing means, said optical means and said control circuit means therewithin and includes means defining an optical window of an infrared radiation pervious material passing infrared radiation into said housing means, said optical means supported within said housing means behind said optical window.

33. A control switch assembly according to claim 32, wherein said housing means comprises a base and a cover, said base having an annular upper wall portion provided with an outer peripheral groove defining a mounting channel for the lower edge of said optical window, said base further defining mounting means for receiving said optic shell inwardly of said window and locating same relative to the optical window with its reflective surfaces located behind said optical window, and said cover having a generally annular shaped lower edge provided with a peripheral channel for receiving the upper edge of said optical window and locking means including a plurality of hook members extending upwardly from said base annular wall and a plurality of latch members depending from said cover and cooperating with said hook members to lock said cover to said base with the optical window located therebetween.

34. A control switch assembly according to claim 33, wherein said cover has first connection means at its upper end including a threaded terminal portion constructed and arranged to be received in a conventional light bulb socket and first contact means providing an electrical connection between said terminal portion and an input terminal of said circuit means; and wherein said base has second connection means at its lower end including socket means constructed and arranged to receive the threaded base portion of a light bulb, and second contact means, providing an electrical connection between said socket means and an output terminal of said circuit means.

35. A control switch assembly according to claim 34, wherein said sensing means includes a sensing element and means mounting said sensing element on the top edge of said intermediate wall and wherein said circuit means is constructed and arranged for mounting on the upper edge of said optic shell in overlying relation with said sensing element, said sensing means further including means connecting electrodes of said sensing element to input terminals of said circuit means.

36. A control switch assembly according to claim 35, wherein said first contact means includes a contact having one end attached to said cover and connected to said terminal portion and its other end connected to said input terminal of said circuit means and wherein said second contact means includes first and second contacts mounted on an upper surface of said base and extending vertically within said housing means, each having a vertical length greater than the vertical height of said optic shell, said optic shell provided with first and second depressed portions at opposite ends walls thereof, said first and second contacts of said second contact means extending along said depressed portion with said first contact electrically connecting said output terminal of said circuit means to said socket means, and said second contact interconnecting common terminals of said first and second connection means.

37. An infrared radiation actuated control switch assembly responsive to infrared radiation within a room for controlling the energization of a source of illumination said control switch assembly attachable to a mounted socket and comprising:

infrared radiation sensing means; optical means; control circuit means; and a housing;

said housing enclosing said sensing means, said optical means and said control circuit means therewithin and including means for mechanically and electrically engaging the socket, said housing carrying a lamp socket for receiving the source of illumination;

said optical means including first reflecting means which responds to infrared radiation in a look-out sensing field, second reflecting means which responds to infrared radiation on a look-out sensing field, and a focusing means cooperating with said first and second reflecting means to direct infrared radiation present in the sensing fields onto said sensing means;

said sensing means responding to infrared radiation directed thereto to generate a control output indicative of movement of a source of infrared radiation within the room;

said control circuit means connected to said sensing means and responsive to its control input for energizing the source of illumination and for maintaining the source of illumination energized as long as detection of movement of a source of infrared radiation within the room.

38. A control switch assembly according to claim 37, wherein said control circuit means includes delay means for maintaining the lamp energized for a predetermined time after infrared radiation is no longer detected within the field of view.

39. A control switch assembly according to claim 37, wherein said control circuit means includes light sensing means responsive to ambient light for inhibiting generation of said control output when the ambient light level exceeds a predetermined value.

40. An optical array for directing infrared radiation generated by a moving source from a plurality of sensing fields to a single infrared radiation sensor with a plurality of spaced apart sensing elements; said optical array comprising:

a hollow body having first and second side walls, first and second end walls, and an intermediate wall, said end walls interconnecting said side walls near the ends thereof, said side walls having opposing concave reflective surface portions defining first and second focusing mirrors;

said intermediate wall extending along the longitudinal axis of said body between said end walls and having first and second planar reflective surfaces facing said first and second focusing mirrors, respectively, and positioned to reflect infrared radiation onto said focusing mirrors, and third and fourth planar reflective surfaces facing said first and second focusing mirrors, respectively, and located at the focal points thereof, for reflecting infrared radiation focused by said focusing mirrors onto a central region of the sensor with the array including means for sweeping the focused radiation along said central region onto different elements of the sensor as the source of radiation moves.

41. An optical array according to claim 40, wherein said concave reflecting surface portion each comprises a parabolic surface of revolution curved along mutually perpendicular axes.

42. An optical array according to claim 40, wherein said hollow body is made of an electrically insulating material with the surface portions selectively metalized with a reflective metal providing said concave surface portions and said planar reflective surfaces.

43. An optical array according to claim 40, wherein said optical means includes first and second radiation directing means each associated with a different one of said optical systems and each comprising first and second planar extensions of said body, each generally rectangular in shape and extending generally vertically and projecting outwardly from said body at one side thereof and at an angle to one another, the included angle therebetween being in the range of 40° to 60°, defining a center sensing field between said extensions and first and second side sensing fields, one on either side of said center sensing field, and said extensions having reflective surface portions facing said side sensing fields, whereby infrared radiation from said center sensing field passes directly to the associated planar reflecting surface and infrared radiation from said first and second side sensing fields is reflective onto the associated collecting mirror by the reflective surfaces of said extensions.

44. An optical array according to claim 41, wherein said directing means further includes first and second members each extending in a generally horizontal plane outwardly from the body at opposite sides thereof, each having a planar surface with a plurality of reflective portions facing downwardly of the body, whereby infrared radiation from said sensing fields beneath the control assembly are reflected onto said first and second collecting mirrors by said members.

45. An optical array according to claim 40, wherein said intermediate wall includes first and second rectangular panels, the outer surfaces of which have reflective portions inclined inwardly from the bottom edge to the top edge of said intermediate wall, defining said first and second planar reflective surfaces, and upper edge portion of said panels inclined inwardly at a predetermined angle and rising to a peak at the center of said intermediate wall, defining said third and fourth planar reflective surfaces.

46. An optical array according to claim 45, wherein said intermediate wall defines indexing means at its top edge located at the ends of said upper edge portions of said panels to locate the sensing element adjacent to said third and fourth reflective surfaces.

47. An infrared radiation activated control switch assembly operable to energize an electrical unit and engageable with a electrical socket comprising:
   a housing;
   means carried by said housing for engaging the electrical socket mechanically and electrically;
   means carried by said housing, spaced from said socket engaging means, for removably supporting the electrical unit mechanically and for electrically engaging the unit;
   means, carried by said housing, for sensing infrared radiation with said sensing means including means for collecting radiation incident thereon from a 360° degree region surrounding said housing; and
   control means coupled between said sensing means and said unit engaging means, responsive to infrared radiation incident on said sensing means, for energizing the electrical unit with said collecting means positioned between said socket engaging means and said electrical unit supporting means.

* * * * *